US012286905B2

(12) United States Patent
Husband et al.

(10) Patent No.: US 12,286,905 B2
(45) Date of Patent: Apr. 29, 2025

(54) ROTOR ASSEMBLY FOR GAS TURBINE ENGINES

(71) Applicant: RTX CORPORATION, Farmington, CT (US)

(72) Inventors: Jason Husband, South Glastonbury, CT (US); James Glaspey, Farmington, CT (US); Aaron John Pepin, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/456,126

(22) Filed: Aug. 25, 2023

(65) Prior Publication Data

US 2023/0399956 A1    Dec. 14, 2023

Related U.S. Application Data

(60) Division of application No. 17/380,397, filed on Jul. 20, 2021, now Pat. No. 11,753,951, which is a
(Continued)

(51) Int. Cl.
*F01D 5/30* (2006.01)
*F01D 5/02* (2006.01)
(Continued)

(52) U.S. Cl.
CPC ............. *F01D 5/3053* (2013.01); *F01D 5/02* (2013.01); *F01D 5/147* (2013.01); *F01D 5/282* (2013.01);
(Continued)

(58) Field of Classification Search
CPC ..... F01D 5/02; F01D 5/10; F01D 5/26; F01D 5/3023; F01D 5/303; F01D 5/3038;
(Continued)

(56) References Cited

U.S. PATENT DOCUMENTS 3,554,667 A    1/1971  Wagle
3,554,668 A    1/1971  Wagle
(Continued)

FOREIGN PATENT DOCUMENTS

EP    0607082    7/1994
EP    1167692    1/2002
(Continued)

OTHER PUBLICATIONS

International Search Report and Written Opinion for PCT Application No. PCT/US2014/050614 completed Nov. 19, 2014.
(Continued)

*Primary Examiner* — Christopher R Legendre
(74) *Attorney, Agent, or Firm* — Carlson, Gaskey & Olds, P.C.

(57) ABSTRACT

A rotor assembly for a gas turbine engine includes a rotatable hub that has a main body and an array of annular flanges that extend about an outer periphery of the main body to define an array of annular channels. An array of airfoils are circumferentially distributed about the outer periphery. Each one of the airfoils includes an airfoil section extending from a root section received in the annular channels. Retention pins extend through the root section of a respective one of the airfoils and through the array of annular flanges to mechanically attach each root section to the hub.

20 Claims, 21 Drawing Sheets

Related U.S. Application Data continuation-in-part of application No. 16/163,641, filed on Oct. 18, 2018, now Pat. No. 11,092,020.

(51) Int. Cl.
  *F01D 5/14* (2006.01)
  *F01D 5/28* (2006.01)
  *F01D 11/00* (2006.01)

(52) U.S. Cl.
  CPC .......... *F01D 5/3038* (2013.01); *F01D 11/008* (2013.01); *F05D 2240/301* (2013.01); *F05D 2240/80* (2013.01); *F05D 2260/30* (2013.01); *F05D 2260/31* (2013.01); *F05D 2300/603* (2013.01); *F05D 2300/702* (2013.01)

(58) Field of Classification Search
  CPC .. F01D 5/3046; F01D 5/3053; F05D 2220/36; F05D 2240/80; F05D 2260/31
  See application file for complete search history.

(56) References Cited

U.S. PATENT DOCUMENTS

| | | |
|---|---|---|
| 3,694,104 A | 9/1972 | Erwin |
| 4,643,647 A | 2/1987 | Perry |
| 5,022,824 A | 6/1991 | Violette et al. |
| 5,022,825 A | 6/1991 | Violette et al. |
| 5,129,787 A | 7/1992 | Violette et al. |
| 5,163,817 A | 11/1992 | Violette et al. |
| 5,165,856 A | 11/1992 | Schilling |
| 5,242,270 A | 9/1993 | Partington et al. |
| 5,281,096 A | 1/1994 | Harris et al. |
| 5,409,353 A | 4/1995 | Imbault |
| 5,464,326 A | 11/1995 | Knott |
| 5,791,879 A | 8/1998 | Fitzgerald et al. |
| 5,839,882 A | 11/1998 | Finn et al. |
| 6,039,542 A | 3/2000 | Schilling et al. |
| 6,213,719 B1 | 4/2001 | Violette |
| 6,213,720 B1 | 4/2001 | Farmer |
| 6,217,283 B1 | 4/2001 | Ravenhall et al. |
| 6,422,820 B1 | 7/2002 | Anderson |
| 6,872,340 B2 | 3/2005 | Cundiff et al. |
| 7,503,750 B1 | 3/2009 | Violette |
| 7,828,526 B2 | 11/2010 | Cairo et al. |
| 7,918,644 B2 | 4/2011 | Schreiber |
| 8,241,003 B2 | 8/2012 | Roberge |
| 8,246,310 B2 | 8/2012 | Pierrot et al. |
| 8,277,186 B2 | 10/2012 | Tanaka |
| 8,496,438 B2 | 7/2013 | Lafont |
| 8,616,849 B2 | 12/2013 | Menheere et al. |
| 8,834,125 B2 | 9/2014 | Alvanos |
| 8,845,292 B2 | 9/2014 | Lafont |
| 9,145,784 B2 | 9/2015 | Evans et al. |
| 9,228,535 B2 | 1/2016 | Magowan |
| 9,297,268 B2 | 3/2016 | Alarcon |
| 9,366,155 B2 | 6/2016 | Tutaj |
| 9,840,921 B2 | 12/2017 | Petellaz et al. |
| 10,018,055 B2 | 7/2018 | Robertson |
| 10,371,165 B2 | 8/2019 | Weisse et al. |
| 10,378,440 B2 | 8/2019 | Sheridan |
| 10,507,518 B2 | 12/2019 | Merrill et al. |
| 11,092,020 B2 | 8/2021 | Husband et al. |
| 11,753,951 B2 * | 9/2023 | Husband ............... F01D 5/3038 416/204 R |
| 2008/0181766 A1 | 7/2008 | Campbell et al. |
| 2008/0232969 A1 | 9/2008 | Brault |
| 2009/0047132 A1 | 2/2009 | Riley et al. |
| 2009/0285686 A1 | 11/2009 | Violette |
| 2013/0039774 A1 | 2/2013 | Viens et al. |
| 2013/0064676 A1 | 3/2013 | Salisbury et al. |
| 2013/0167555 A1 | 7/2013 | Schwarz et al. |
| 2016/0146021 A1 | 5/2016 | Freeman et al. |
| 2017/0138207 A1 | 5/2017 | Niergarth et al. |
| 2017/0254207 A1 | 9/2017 | Schetzel et al. |
| 2018/0119707 A1 | 5/2018 | Murdock |
| 2019/0284938 A1 | 9/2019 | Senile et al. |
| 2020/0123916 A1 | 4/2020 | Husband |
| 2021/0348515 A1 | 11/2021 | Husband et al. |
| 2023/0399956 A1 * | 12/2023 | Husband ................. F01D 5/147 |

FOREIGN PATENT DOCUMENTS

| | | |
|---|---|---|
| EP | 2362066 | 8/2011 |
| EP | 2458153 | 5/2012 |
| EP | 3168424 | 5/2017 |

OTHER PUBLICATIONS

International Preliminary Report on Patentability for PCT Application No. PCT/US2014/050614 completed Mar. 15, 2016.
Extended European Search Report for European Patent Application No. 14842050.8 completed May 9, 2017.
European Search Report for European Patent Application No. 19203660.6 completed May 19, 2020.
European Search Report for European Patent Application No. 23201468.8 mailed Dec. 11, 2023.

* cited by examiner

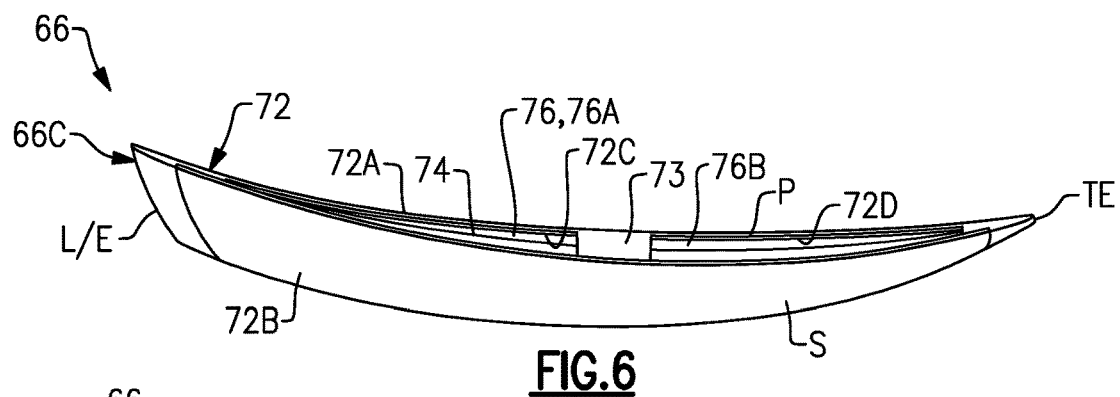
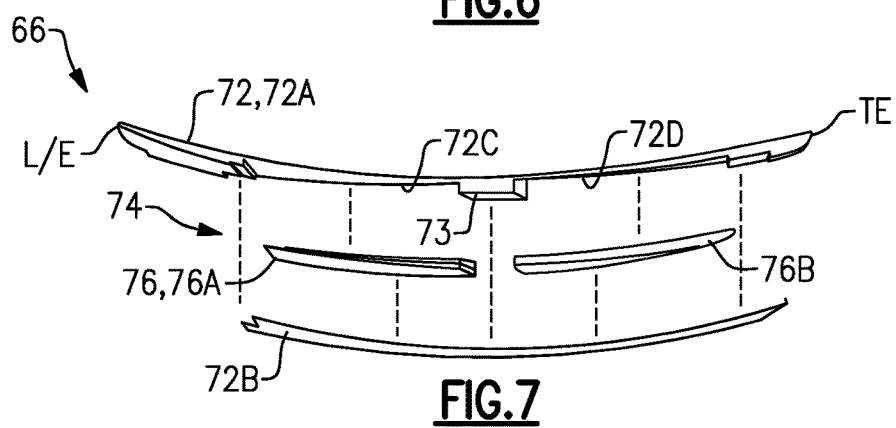
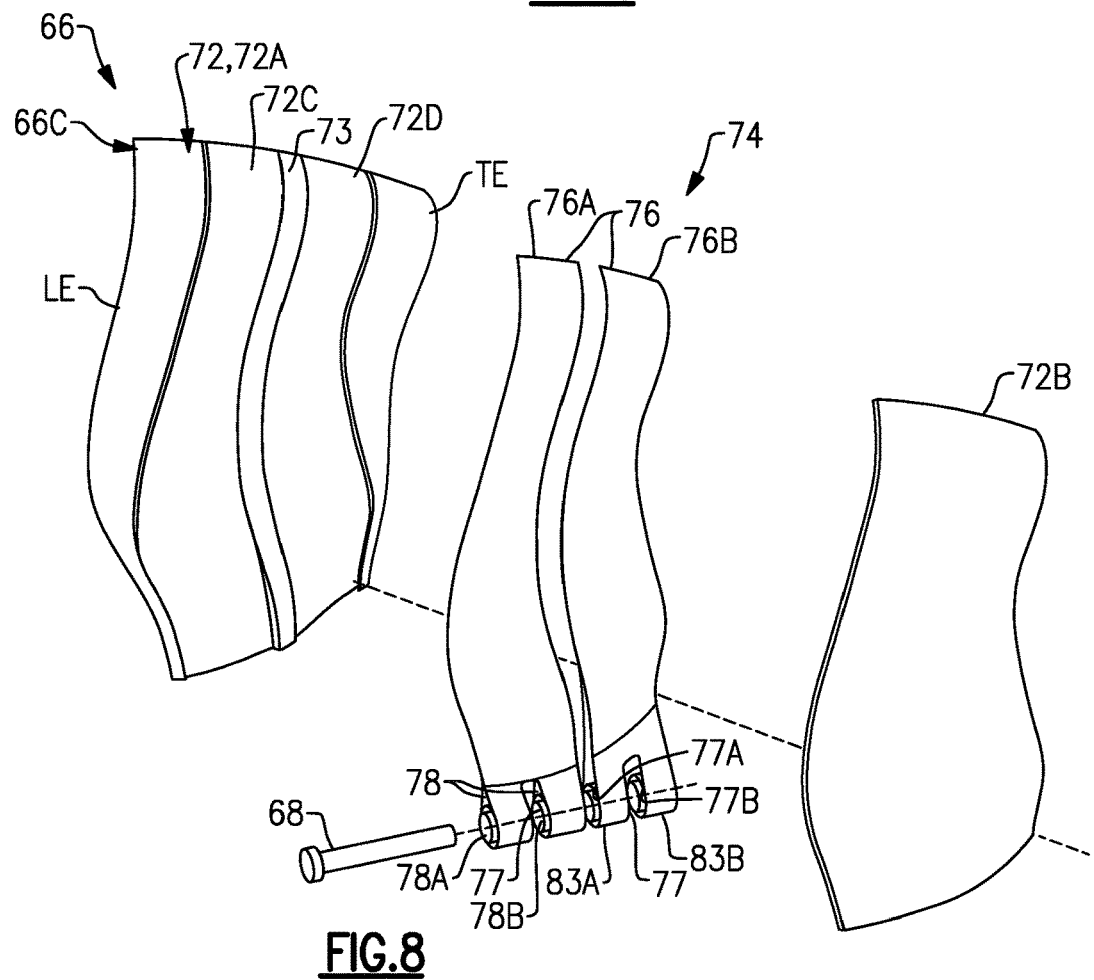

ROTOR ASSEMBLY FOR GAS TURBINE ENGINES

CROSS-REFERENCE TO RELATED APPLICATIONS

This application is a divisional of U.S. patent application Ser. No. 17/380,397, filed on Jul. 20, 2021, which is a continuation in-part of U.S. patent application Ser. No. 16/163,641, filed on Oct. 18, 2018.

BACKGROUND

This disclosure relates to a gas turbine engine, and more particularly to a rotor assembly including a hub that carries an array of airfoils.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The fan typically includes an array of fan blades having dovetails that are mounted in slots of a fan hub.

SUMMARY

A rotor assembly for a gas turbine engine according to an example of the present disclosure includes a rotatable hub that has a metallic main body that extends along a longitudinal axis, and that has an array of annular flanges that extend about an outer periphery of the main body to define an array of annular channels along the longitudinal axis. Each of the annular channels receives a composite reinforcement member that extends about the outer periphery of the hub.

A further embodiment of any of the foregoing embodiments includes an array of airfoils circumferentially distributed about the outer periphery. Each one of the airfoils has an airfoil section that extends from a root section received in the annular channels. A plurality of retention pins extends through the root section of a respective one of the airfoils and through the array of annular flanges to mechanically attach the root section to the hub. An array of platforms are mechanically attached to the hub and that abut against respective pairs of the airfoils radially outward of the retention pins.

In a further embodiment of any of the foregoing embodiments, the airfoil section includes a metallic sheath and a composite core. The core includes first and second ligaments at least partially received in respective internal channels defined in the sheath.

In a further embodiment of any of the foregoing embodiments, the composite reinforcement member includes at least one composite layer that extends around the outer periphery.

In a further embodiment of any of the foregoing embodiments, the composite reinforcement member defines a first thickness, and the hub defines a second thickness along the outer periphery that defines a respective one of the annular channels, and the second thickness is less than the first thickness.

In a further embodiment of any of the foregoing embodiments, the at least one composite layer is a plurality of composite layers, and the composite reinforcement member is a carbon tape wound around the outer periphery two or more times to define the composite layers.

In a further embodiment of any of the foregoing embodiments, each of the flanges is defined by a plurality of scallops arranged in a respective row about the outer periphery of the hub.

A rotor assembly for a gas turbine engine according to an example of the present disclosure includes a rotatable hub that has a main body that extends along a longitudinal axis, and that has an array of annular flanges that extend about an outer periphery of the main body to define an array of annular channels along the longitudinal axis. An array of airfoils are circumferentially distributed about the outer periphery. Each one of the airfoils has an airfoil section that extends from a root section. The root section is received in the annular channels and mechanically attached to the hub. An array of retention members, extend outwardly from one of the annular flanges and having a contact surface dimensioned to abut against the airfoil section of a respective one of the airfoils.

In a further embodiment of any of the foregoing embodiments, each of the retention members includes a retention body that has an L-shaped geometry that extends between a first end and a second end defining the contact surface such that the retention body reacts but yields to a load on a respective one of the airfoils in operation, and the retention body is integrally formed with a respective one of the annular flanges.

In a further embodiment of any of the foregoing embodiments, the airfoil section is moveable between first and second positions such that the contact surface is spaced apart from the airfoil section to define a circumferential gap in the first position, but abuts against the airfoil section in the second position. Each of the retention members defines one or more cutouts in a thickness of the retention body.

In a further embodiment of any of the foregoing embodiments, the airfoil section extends between a leading edge and a trailing edge in a chordwise direction and extends between a tip portion and the root section in a radial direction, and the airfoil section defines a pressure side and a suction side separated in a thickness direction. The contact surface of each of the retention members is dimensioned to abut against the pressure side or the suction side of a respective one of the airfoils further including an array of platforms mechanically attached to the hub and that abut against respective pairs of the airfoils radially inward of the contact surface of each of the retention members.

A further embodiment of any of the foregoing embodiments includes a plurality of retention pins. Each one of the retention pins extends through the root section of a respective one of the airfoils and through the array of annular flanges to mechanically attach the root section to the hub.

In a further embodiment of any of the foregoing embodiments, each of the retention pins includes a plurality of segments slideably received on an elongated carrier, and the carrier defines a curved pin axis when in an installed position.

A gas turbine engine according to an example of the present disclosure includes a fan section that has a fan shaft rotatable about an engine longitudinal axis. At least one bearing assembly supports the fan shaft. The fan section includes a rotor assembly. The rotor assembly includes a rotatable hub that has a main body mechanically attached to the fan shaft, and that has an array of annular flanges that extends about an outer periphery of the main body to define an array of annular channels along the engine longitudinal axis. Each of the annular channels receives a composite reinforcement member that extends about the outer periphery. An array of airfoils each have an airfoil section that extend from a root section. A plurality of retention pins extend through the root section of a respective one of the airfoils, across the annular channels, and through the annular flanges to mechanically attach the root section to the hub.

In a further embodiment of any of the foregoing embodiments, the airfoil section includes a metallic sheath and a composite core. The core includes first and second ligaments at least partially received in respective internal channels defined in the sheath.

In a further embodiment of any of the foregoing embodiments, each one of the ligaments includes at least one interface portion in the root section that receives a respective one of the retention pins, and each one of the ligaments includes at least one composite layer that loops around the at least one interface portion such that opposed end portions of the at least one composite layer are joined together along the airfoil portion.

In a further embodiment of any of the foregoing embodiments, each of the annular flanges includes an array of retention members, and each of the retention members is integrally formed with and extends outwardly from a respective one of the annular flanges and has an L-shaped geometry defining a contact surface that is dimensioned to abut against a sidewall of the airfoil section of a respective one of the airfoils.

In a further embodiment of any of the foregoing embodiments, the composite reinforcement member is a carbon tape that is wound around the outer periphery two or more times.

In a further embodiment of any of the foregoing embodiments, the composite reinforcement member defines a first thickness, and the hub defines a second thickness along the outer periphery that defines a respective one of the annular channels, and the second thickness is less than the first thickness.

In a further embodiment of any of the foregoing embodiments, the at least one bearing assembly is positioned radially outward of the outer periphery of the hub with respect to the engine longitudinal axis.

A further embodiment of any of the foregoing embodiments includes a fan drive turbine that drives the fan shaft through a geared architecture. The at least one bearing assembly supports the fan shaft at a position that is radially outward of the geared architecture with respect to the engine longitudinal axis.

In a further embodiment of any of the foregoing embodiments, the fan section delivers a portion of airflow into a compressor section and another portion of airflow into a bypass duct.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 6 illustrates an end view of an airfoil section of one of the airfoils of FIG. 2.

FIG. 7 illustrates an exploded view of the airfoil section of FIG. 6.

FIG. 8 illustrates an exploded perspective view of an airfoil including the airfoil section of FIG. 6.

DETAILED DESCRIPTION

Figure 1:
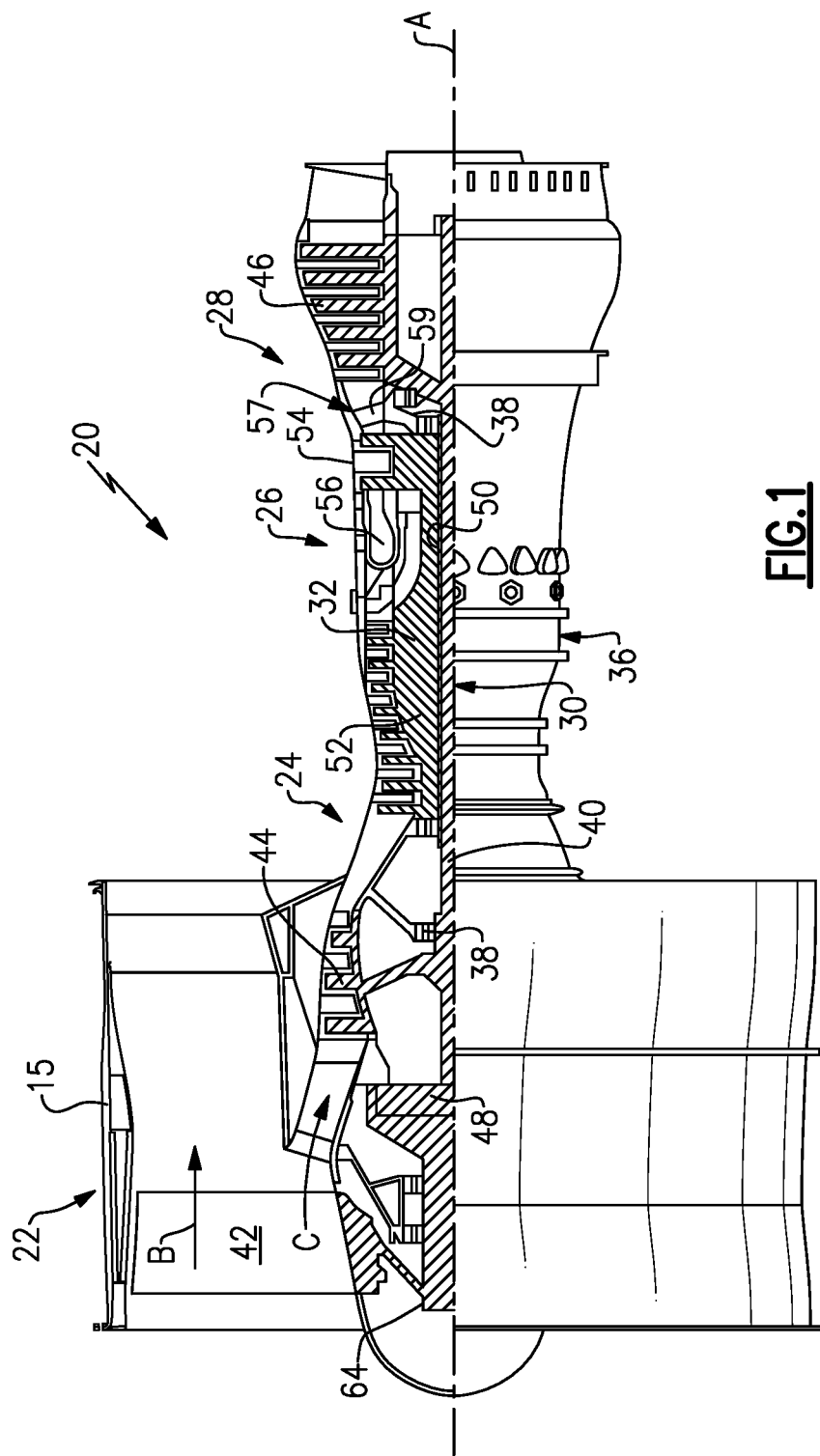
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
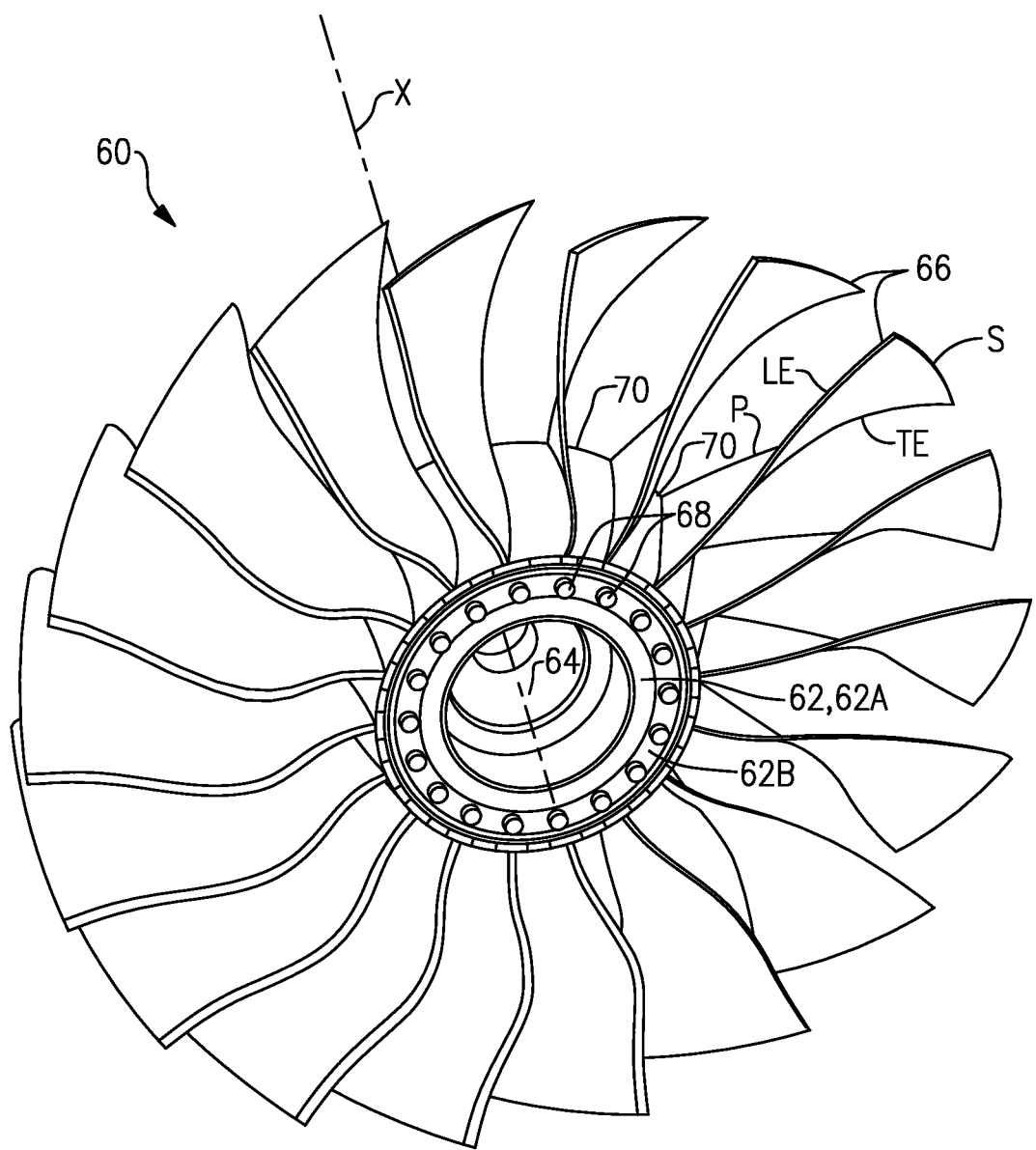
FIG. 2 illustrates a perspective view of an example rotor assembly including an array of airfoils.

FIG. 2 illustrates a rotor assembly 60 for a gas turbine engine according to an example. The rotor assembly 60 can be incorporated into the fan section 12 or the compressor section 24 of the engine 20 of FIG. 1, for example. However, it should to be understood that other parts of the gas turbine engine 20 and other systems may benefit from the teachings disclosed herein. In some examples, the rotor assembly 60 is incorporated into a multi-stage fan section of a direct drive or geared engine architecture.

Figure 3:
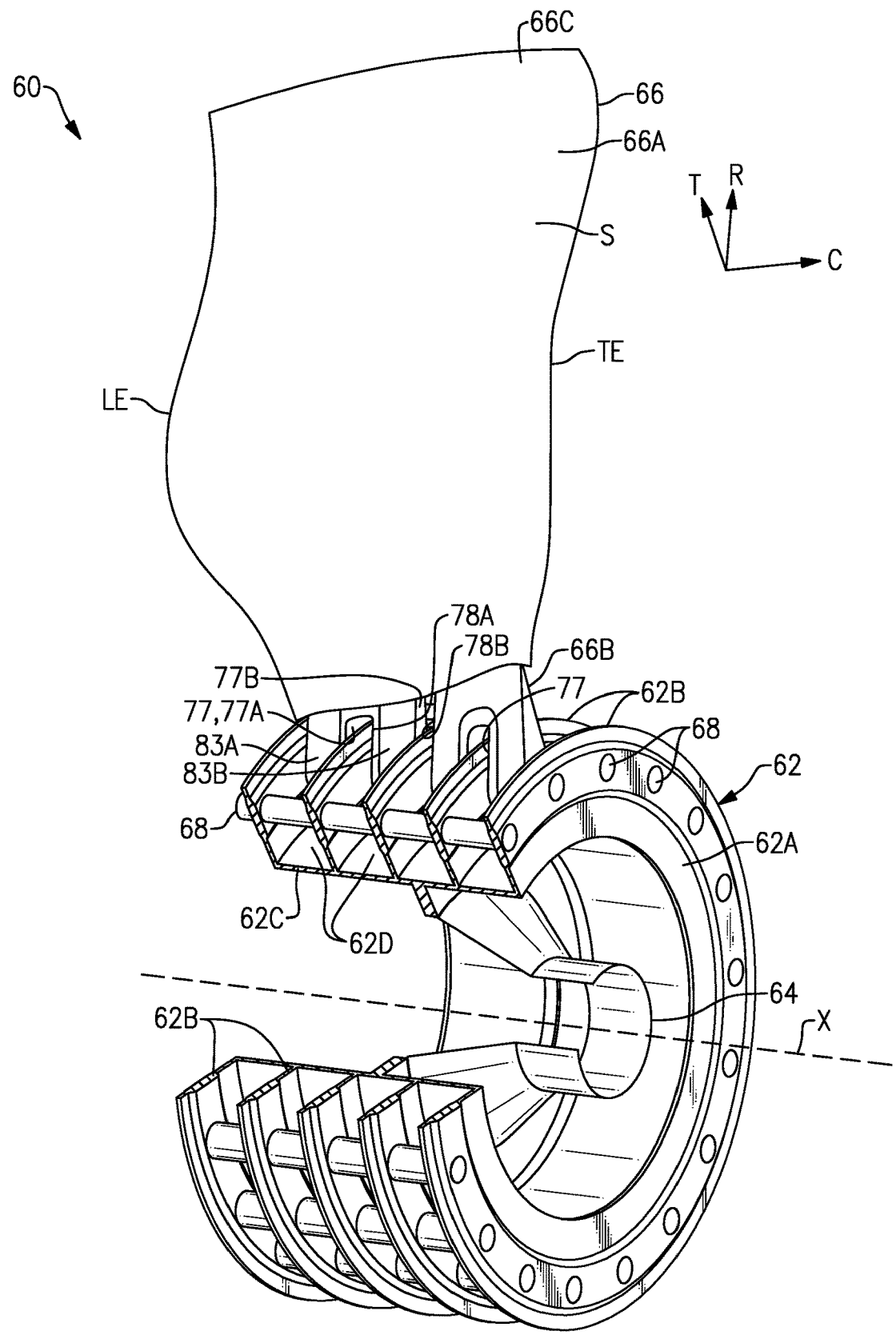
FIG. 3 illustrates a perspective view of one of the airfoils of FIG. 2 secured to a hub.

The rotor assembly 60 includes a rotatable hub 62 mechanically attached or otherwise mounted to a fan shaft 64. The fan shaft 64 is rotatable about longitudinal axis X. The fan shaft 64 can be rotatably coupled to the low pressure turbine 46 (FIG. 1), for example. The rotatable hub 62 includes a main body 62A that extends along the longitudinal axis X. The longitudinal axis X can be parallel to or collinearly with the engine longitudinal axis A of FIG. 1, for example. As illustrated by FIG. 3, the hub 62 includes an array of annular flanges 62B that extend about an outer periphery 62C of the main body 62A. The annular flanges 62B define an array of annular channels 62D along the longitudinal axis X.

An array of airfoils 66 are circumferentially distributed about the outer periphery 62C of the rotatable hub 62. Referring to FIG. 3, with continued reference to FIG. 2, one of the airfoils 66 mounted to the hub 62 is shown for illustrative purposes. The airfoil 66 includes an airfoil section 66A extending from a root section 66B. The airfoil section 66A extends between a leading edge LE and a trailing edge TE in a chordwise direction C, and extends in a radial direction R between the root section 66B and a tip portion 66C to provide an aerodynamic surface. The tip portion 66C defines a terminal end or radially outermost extent of the airfoil 66 to establish a clearance gap with fan case 15 (FIG. 1). The airfoil section 66A defines a pressure side P (FIG. 2) and a suction side S separated in a thickness direction T. The root section 66B is dimensioned to be received in each of the annular channels 62D.

Figure 4:
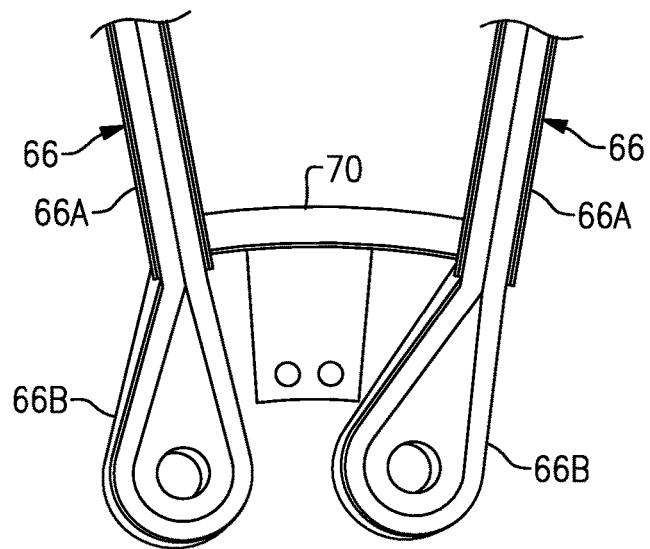
FIG. 4 illustrates adjacent airfoils of the rotor assembly of FIG. 2.

The rotor assembly 60 includes an array of platforms 70 that are separate and distinct from the airfoils 66. The platforms 70 are situated between and abut against adjacent pairs of airfoils 66 to define an inner boundary of a gas path along the rotor assembly as illustrated in FIG. 2. The platforms 70 can be mechanically attached and releasably secured to the hub 62 with one or more fasteners, for example. FIG. 4 illustrates one of the platforms 70 abutting against the airfoil section 66A of adjacent airfoils 66.

Figure 5A:
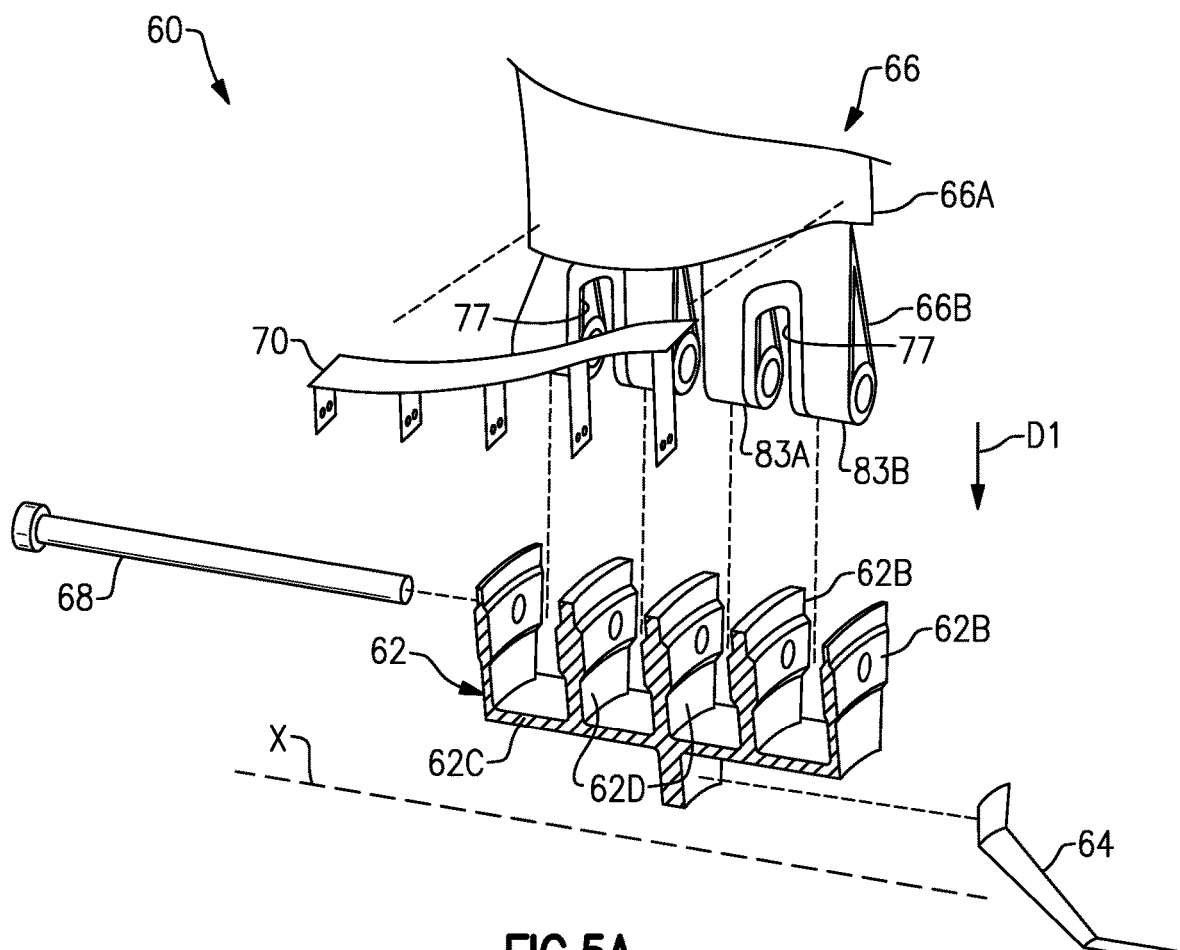
FIG. 5A illustrates an exploded view of portions of the rotor assembly of FIG. 2.
Figure 5B:
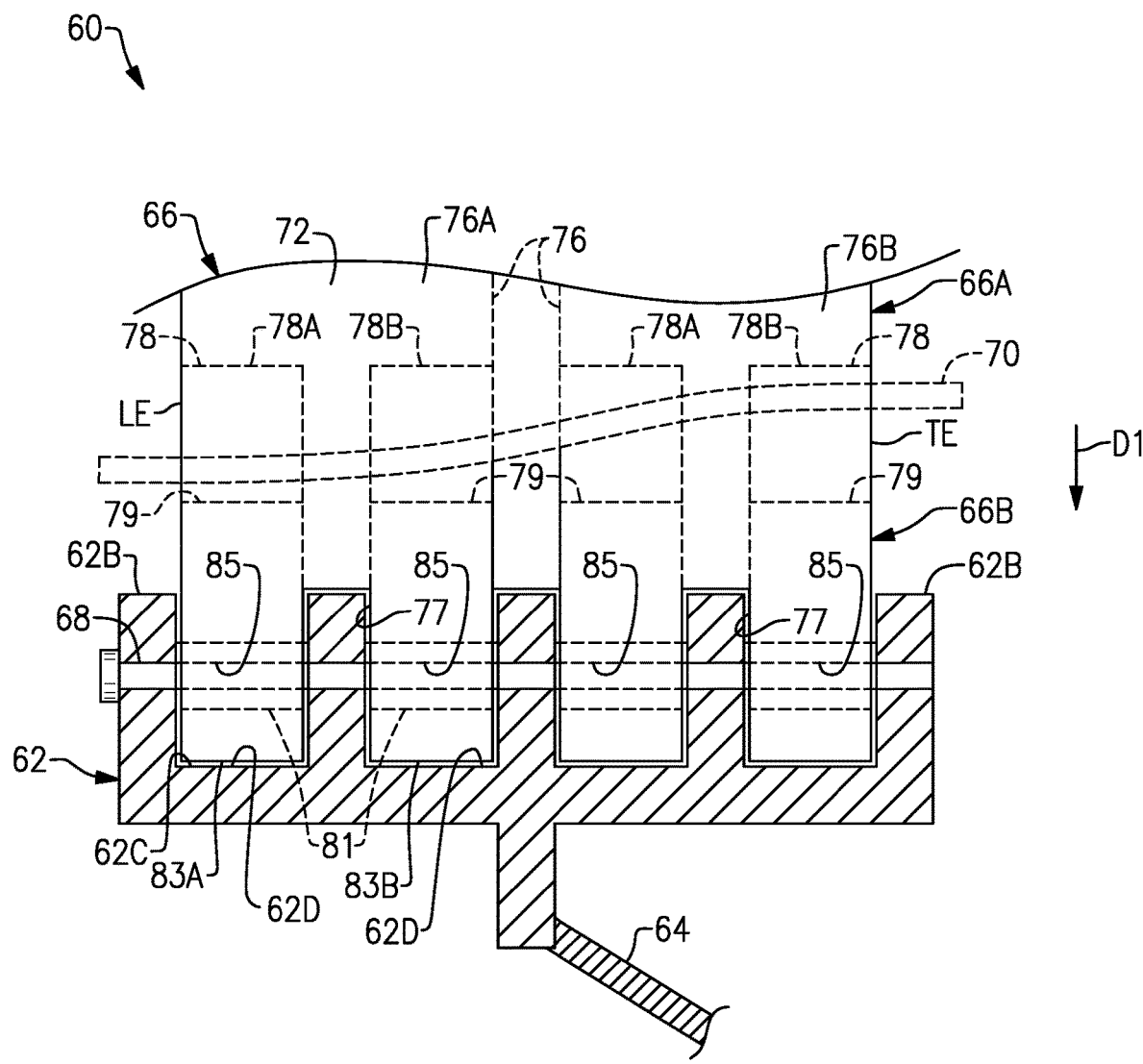
FIG. 5B illustrates a side view of the rotor assembly of FIG. 2 with the hub illustrated in cross-section.

FIG. 5A illustrates an exploded, cutaway view of portions of the rotor assembly 60. FIG. 5B illustrates a side view of one of the airfoils 66 secured to the hub 62. The rotor assembly 60 includes a plurality of retention pins 68 for securing the airfoils 66 to the hub 62 (see FIG. 2). Each of the platforms 70 can abut the adjacent airfoils 66 at a position radially outward of the retention pins 68, as illustrated by FIG. 2.

Each of the retention pins 68 is dimensioned to extend through the root section 66B of a respective one of the airfoils 66 and to extend through each of the flanges 62B to mechanically attach the root section 66B of the respective airfoil 66 to the hub 62, as illustrated by FIGS. 3 and 5B. The retention pins 68 react to centrifugal loads in response to rotation of the airfoils 66. The hub 62 can include at least three annular flanges 62B, such five flanges 62B as shown, and are axially spaced apart relative to the longitudinal axis X to support a length of each of the retention pins 68. However, fewer or more than five flanges 62B can be utilized with the teachings herein. Utilizing three or more flanges 62B can provide relatively greater surface contact area and support along a length each retention pin 68, which can reduce bending and improve durability of the retention pin 68.

The airfoil 66 can be a hybrid airfoil including metallic and composite portions. Referring to FIGS. 6-8, with continuing reference to FIGS. 5A-5B, the airfoil 66 includes a metallic sheath 72 that at least partially receives and protects a composite core 74. In some examples, substantially all of the aerodynamic surfaces of the airfoil 66 are defined by the sheath 72. The sheath 72 can be dimensioned to terminate radially inward prior to the root section 66B such that the sheath 72 is spaced apart from the respective retention pin(s) 68, as illustrated by FIG. 5B. The sheath 72 includes a first skin 72A and a second skin 72B. The first and second skins 72A, 72B are joined together to define an external surface contour of the airfoil 66 including the pressure and suction sides P, S of the airfoil section 66A.

The core 74 includes one or more ligaments 76 that define portions of the airfoil and root sections 66A, 66B. The ligament 76 can define radially outermost extent or tip of the tip portion 66C, as illustrated by FIG. 6. In other examples, the ligaments 76 terminate prior to the tip of the airfoil section 66A. In the illustrative example of FIGS. 6-8, the core 74 includes two separate and distinct ligaments 76A, 76B spaced apart from each other as illustrated in FIGS. 5B and 6. The core 74 can include fewer or more than two ligaments 76, such as three to ten ligaments 76. The ligaments 76A, 76B extend outwardly from the root section 66B towards the tip portion 66C of the airfoil section 66A, as illustrated by FIGS. 3, 6 and 8.

The sheath 72 defines one or more internal channels 72C, 72C to receive the core 74. In the illustrated example of FIGS. 6-8, the sheath 72 includes at least one rib 73 defined by the first skin 72A that extends in the radial direction R to bound the adjacent channels 72C, 72D. The ligaments 76A, 76B are received in respective internal channels 72C, 72D such that the skins 72A, 72B at least partially surround the core 74 and sandwich the ligaments 76A, 76B therebetween, as illustrated by FIG. 6. The ligaments 76A, 76B receive the common retention pin 68 such that the common retention pin 68 is slideably received through at least three, or each, of annular flanges 62B. The common retention pin 68 is dimensioned to extend through each and every one of the interface portions 78 of the respective airfoil 66 to mechanically attach or otherwise secure the airfoil 66 to the hub 62.

Figure 9:
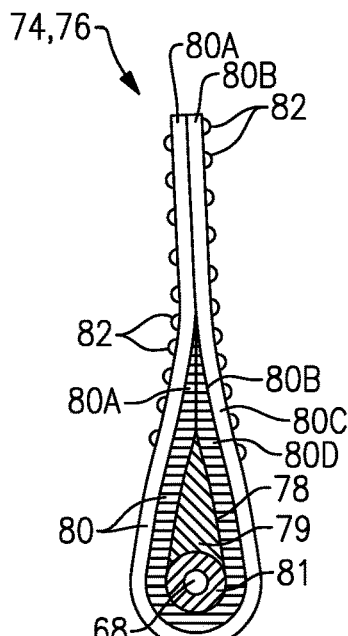
FIG. 9 illustrates a sectional view of a composite core.
Figure 10:
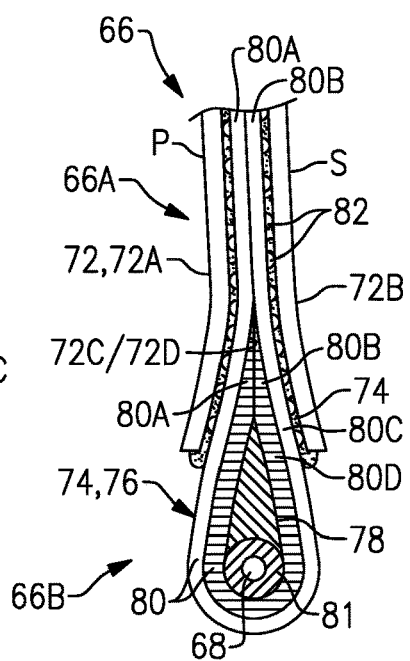
FIG. 10 illustrates a sectional view of the composite core of FIG. 9 secured to a sheath.
Figure 11:
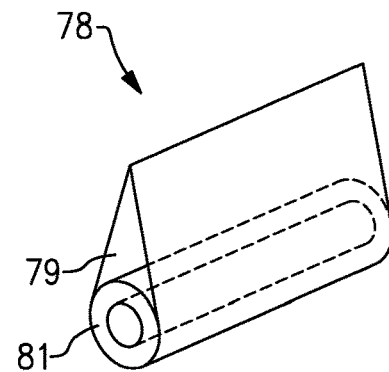
FIG. 11 illustrates an interface portion of the composite core of FIG. 9.
Figure 12:
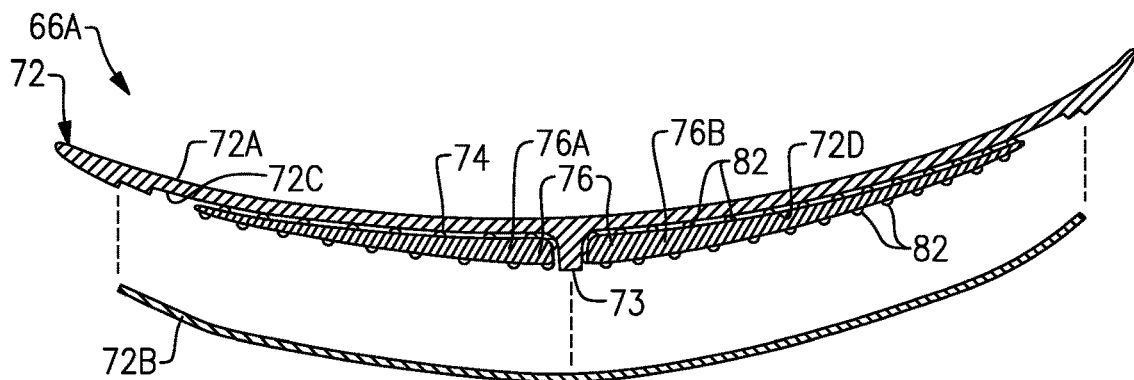
FIG. 12 illustrates the composite core arranged relative to skins of the sheath of FIG. 10.

Referring to FIGS. 9-10, with continued reference to FIGS. 5A-5B and 6-8, each of one of the ligaments 76 includes at least one interface portion 78 in the root section 66B. FIG. 9 illustrates ligament 76 with the first and second skin 72A, 72B removed. Figure illustrates the core 74 and skins 72A, 72B in an assembled position, with the interface portion 78 defining portions of the root section 66B. The interface portion 78 includes a wrapping mandrel 79 and a bushing 81 mechanically attached to the mandrel 79 with an adhesive, for example. The bushing 81 is dimensioned to slideably receive one of the retention pins 68 (FIG. 5B). The mandrel 79 tapers from the bushing 81 to define a teardrop profile, as illustrated by FIG. 11.

In the illustrative example of FIGS. 5B and 8, each of the ligaments 76 defines at least one slot 77 in the root section 66B to define first and second root portions 83A, 83B received in the annular channels 62D on opposed sides of the respective flange 62B such that the root portions 83A, 83B are interdigitated with the flanges 62B. The slots 77 can decrease bending of the retention pins 68 by decreasing a distance between adjacent flanges 62B and increase contact area and support along a length of the retention pin 68, which can reduce contact stresses and wear.

Each ligament 76 can include a plurality of interface portions 78 (indicated as 78A, 78B) received in root portions 83A, 83B, respectively. The interface portions 78A, 78B of each ligament 76A, 76B receive a common retention pin 68 to mechanically attach or otherwise secure the ligaments 76A, 76B to the hub 62. The root section 66B defines at least one bore 85 as dimension receive a retention pin 68. In the illustrated example of FIG. 5B, each bore 85 is defined by a respective bushing 81.

Various materials can be utilized for the sheath 72 and composite core 74. In some examples, the first and second skins 72A, 72B comprise a metallic material such as titanium, stainless steel, nickel, a relatively ductile material such as aluminum, or another metal or metal alloy, and the core 74 comprises carbon or carbon fibers, such as a ceramic matrix composite (CMC). In examples, the sheath 72 defines a first weight, the composite core 74 defines a second weight, and a ratio of the first weight to the second weight is at least 1:1 such that at least 50% of the weight of the airfoil 66 is made of a metallic material. The metal or metal alloy can provide relatively greater strength and durability under operating conditions of the engine and can provide relatively greater impact resistance to reduce damage from foreign object debris (FOD). The composite material can be relatively strong and lightweight, but may not be as ductile as metallic materials, for example. The hybrid construction of airfoils 66 can reduce an overall weight of the rotor assembly 60.

In the illustrative example of FIGS. 9 and 10, each of the ligaments 76 includes at least one composite layer 80. Each composite layer 80 can be fabricated to loop around the interface portion 78 and retention pin 68 (when in an installed position) such that opposed end portions 80A, 80B of the respective layer 80 are joined together along the airfoil portion 66A. The composite layers 80 can be dimensioned to define a substantially solid core 74, such that substantially all of a volume of the internal cavities 72C, 72D of the sheath 72 are occupied by a composite material comprising carbon. In the illustrated example of FIGS. 9 and 10, the composite layers 80 include a first composite layer 80C and a second composite layer 80D between the first layer 80C and an outer periphery of the interface portion 78. The composite layers 80C and 80D can be fabricated to each loop around the interface portion 78 and the retention pin 68.

The layers 80 can include various fiber constructions to define the core 74. For example, the first layer 80C can define a first fiber construction, and the second layer 80D can define a second fiber construction that differs from the first fiber construction. The first fiber construction can include one or more uni-tape plies or a fabric, and the second fiber construction can include at least one ply of a three-dimensional weave of fibers as illustrated by layer 80-1 of FIG. 14A, for example. It should be appreciated that uni-tape plies include a plurality of fibers oriented in the same direction ("uni-directional"), and fabric includes woven or interlaced fibers, each known in the art. In examples, each of the first and second fiber constructions includes a plurality of carbon fibers. However, other materials can be utilized for each of the fiber constructions, including fiberglass, Kevlar®, a ceramic such as Nextel™, a polyethylene such as Spectra®, and/or a combination of fibers.

Figure 14B:
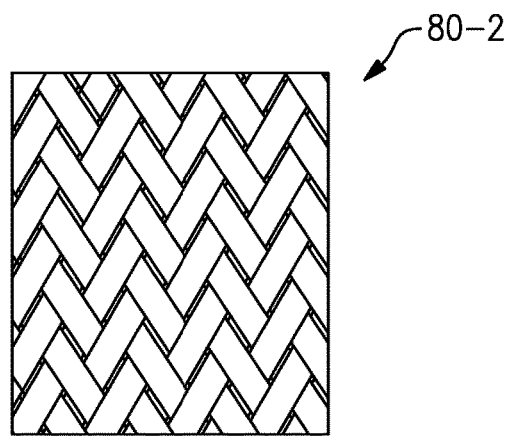
FIG. 14B illustrates a plurality of braided yarns for a composite layer.
Figures 14A, 14C, 14D, 14E:
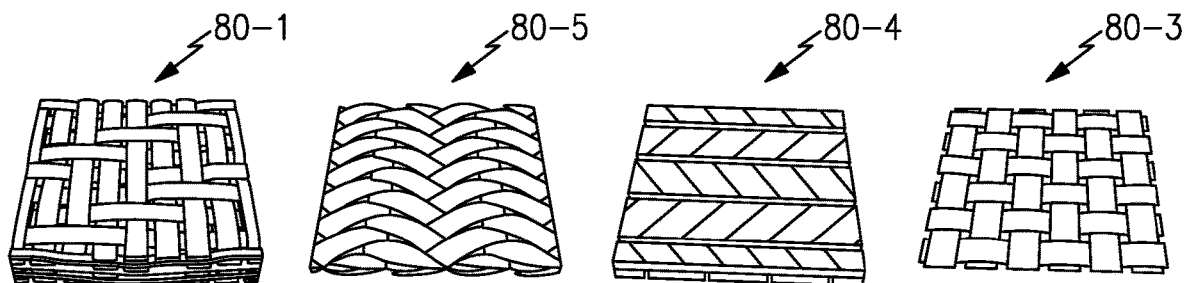
FIG. 14A illustrates a three-dimensional woven fabric for a composite layer.
FIG. 14C illustrates a two-dimensional woven fabric for a composite layer.
FIG. 14D illustrates a non-crimp fabric for a composite layer.
FIG. 14E illustrates a tri-axial braided fabric for a composite layer.

Other fiber constructions can be utilized to construct each of the layers 80, including any of the layers 80-2 to 80-5 of FIGS. 14B-14E. FIG. 14B illustrates a layer 80-2 defined by a plurality of braided yarns. FIG. 14C illustrates a layer 80-3 defined by a two-dimensional woven fabric. FIG. 14D illustrates a layer 80-4 defined by a non-crimp fabric. FIG. 14E illustrates a layer 80-5 defined by a tri-axial braided fabric. Other example fiber constructions include biaxial braids and plain or satin weaves.

The rotor assembly 60 can be constructed and assembled as follows. The ligaments 76A, 76B of core 74 are situated in the respective internal channels 72C, 72D defined by the sheath 72 such that the ligaments 76A, 76B are spaced apart along the root section 66B by one of the annular flanges 62B and abut against opposed sides of rib 73, as illustrated by FIGS. 5B, 6 and 13.

In some examples, the ligaments 76A, 76B are directly bonded or otherwise mechanically attached to the surfaces of the internal channels 72C, 72D. Example bonding materials can include polymeric adhesives such as epoxies, resins such as polyurethane and other adhesives curable at room temperature or elevated temperatures. The polymeric adhesives can be relatively flexible such that ligaments 76 are moveable relative to surfaces of the internal channels 72C, 72D to provide damping during engine operation. In the illustrated example of FIGS. 9-10 and 12-13, the core 74 includes a plurality of stand-offs or detents 82 that are distributed along surfaces of the ligaments 76. The detents 82 are dimensioned and arranged to space apart the ligaments 76 from adjacent surfaces of the internal channels 72C, 72D. Example geometries of the detents 82 can include conical, hemispherical, pyramidal and complex geometries. The detents 82 can be uniformly or non-uniformly distributed. The detents 82 can be formed from a fiberglass fabric or scrim having raised protrusions made of rubber or resin that can be fully cured or co-cured with the ligaments 76, for example.

Figure 13:
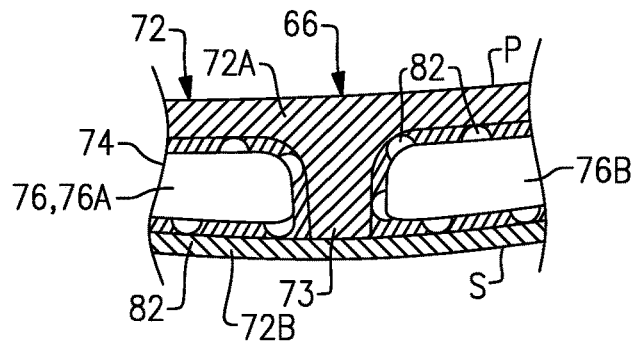
FIG. 13 illustrates a sectional view of the airfoil of FIG. 10.

The second skin 72B is placed against the first skin 72A to define an external surface contour of the airfoil 66, as illustrated by FIGS. 6 and 13. The skins 72A, 72B can be welded, brazed, riveted or otherwise mechanically attached to each other, and form a "closed loop" around the ligaments 76.

The detents 82 can define relatively large bondline gaps between the ligaments 76 and the surfaces of the internal channels 72C, 72D, and a relatively flexible, weaker adhesive can be utilized to attach the sheath 72 to the ligaments 76. The relatively large bondline gaps established by the detents 82 can improve flow of resin or adhesive such as polyurethane and reducing formation of dry areas. In examples, the detents 82 are dimensioned to establish bondline gap of at least a 0.020 inches, or more narrowly between 0.020 and 0.120 inches. The relatively large bondline gap can accommodate manufacturing tolerances between the sheath 72 and core 74, can ensure proper positioning during final cure and can ensure proper bond thickness. The relatively large bondline gap allows the metal and composite materials to thermally expand, which can reduce a likelihood of generating discontinuity stresses. The gaps and detents 82 can also protect the composite from thermal degradation during welding or brazing of the skins 72A, 72B to each other.

For example, a resin or adhesive such as polyurethane can be injected into gaps or spaces established by the detents 82 between the ligaments 76 and the surfaces of the internal channels 72C, 72D. In some examples, a relatively weak and/or soft adhesive such as polyurethane is injected into the spaces. Utilization of relatively soft adhesives such as polyurethane can isolate and segregate the disparate thermal expansion between metallic sheath 72 and composite core 74, provide structural damping, isolate the delicate inner fibers of the composite core 74 from relatively extreme welding temperatures during attachment of the second skin 72B to the first skin 72A, and enables the ductile sheath 72 to yield during a bird strike or other FOD event, which can reduce a likelihood of degradation of the relatively brittle inner fibers of the composite core 74.

The composite layers 80 can be simultaneously cured and bonded to each other with the injected resin, which may be referred to as "co-bonding" or "co-curing". In other examples, the composite layers 80 can be pre-formed or pre-impregnated with resin prior to placement in the internal channels 72C, 72D. The composite core 74 is cured in an oven, autoclave or by other conventional methods, with the ligaments 76 bonded to the sheath 72, as illustrated by FIGS. 10 and 13.

The airfoils 66 are moved in a direction D1 (FIGS. 5A-5B) toward the outer periphery 62C of the hub 62. A respective retention pin 68 is slideably received through each bushing 81 of the interface portions 78 and each of the flanges 62B to mechanically attach the ligaments 76 to the flanges 62B. The platforms 70 are then moved into abutment against respective pairs of airfoils 66 at a position radially outward of the flanges 62B to limit circumferential movement of the airfoil sections 66A, as illustrated by FIG. 2.

Mechanically attaching the airfoils 66 with retention pins 68 can allow the airfoil 66 to flex and twist, which can reduce a likelihood of damage caused by FOD impacts by allowing the airfoil 66 to bend away from the impacts. The rotor assembly 60 also enables relatively thinner airfoils which can improve aerodynamic efficiency.

Figure 15:
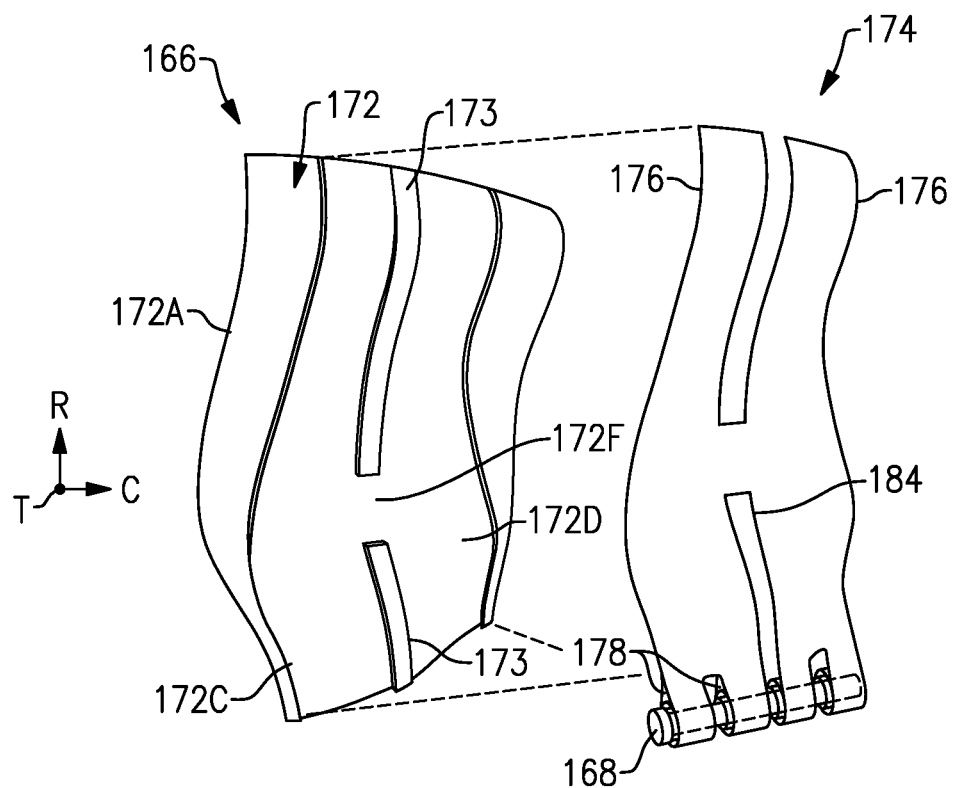
FIG. 15 illustrates an exploded view of an airfoil including a sheath and core according to another example.
Figure 16:
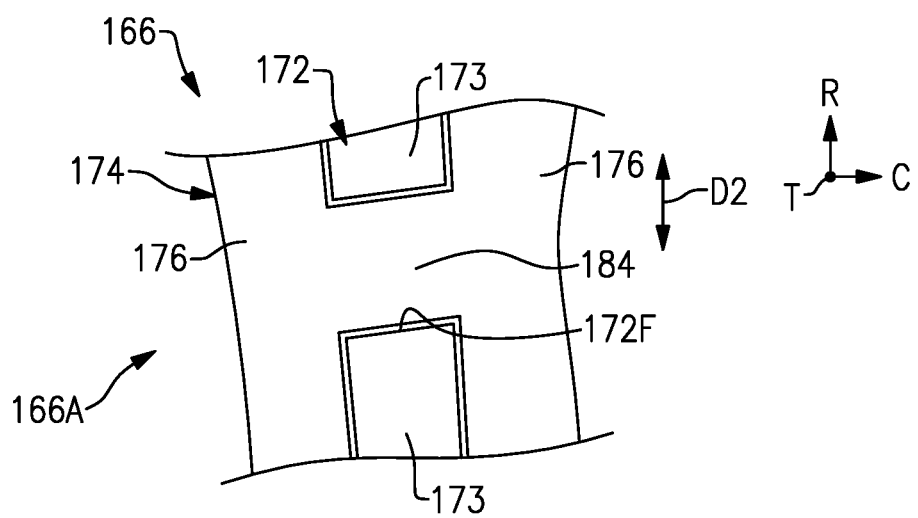
FIG. 16 illustrates the core situated in the sheath of FIG. 15.

FIGS. 15-16 illustrate an airfoil 166 according to another example. In this disclosure, like reference numerals designate like elements where appropriate and reference numerals with the addition of one-hundred or multiples thereof designate modified elements that are understood to incorporate the same features and benefits of the corresponding original elements. A first skin 172A of sheath 172 defines internal channels 172C, 172D. The internal channels 172C, 172D are adjacent to each other and are bounded by a pair of opposing ribs 173. The ribs 173 can extend in a radial direction R, for example, and are spaced apart along an internal gap 172F that interconnects the internal cavities 172C, 172D. The internal gap 172F can be spaced apart from the radial innermost and outermost ends of the first skin 172A of the sheath 172. Composite core 174 includes a ligament bridge 184 that interconnects an adjacent pair of ligaments 176 at a location radially outward of a common pin 168 (shown in dashed lines in FIG. 15 for illustrative purposes). The ligament bridge 184 can be made of any of the materials disclosed herein, such as a composite material.

The ligament bridge 184 is dimensioned to be received within the gap 172F. The ligament bridge 184 interconnects the adjacent pair of ligaments 176 in a position along the airfoil section 166A when in the installed position. During operation, the core 174 may move in a direction D2 (FIG. 16) relative to the sheath 172, which can correspond to the radial direction R, for example. The ligament bridge 184 is dimensioned to abut against the opposing ribs 173 of the sheath 172 in response to movement in direction D2 to react blade pull and bound radial movement of the core 174 relative to the sheath 172. The ligament bridge 184 serves as a fail-safe by trapping the ligaments 176 to reduce a likelihood of liberation of the ligaments 176 which may otherwise occur due to failure of the bond between the sheath 172 and ligaments 176.

Figure 17:
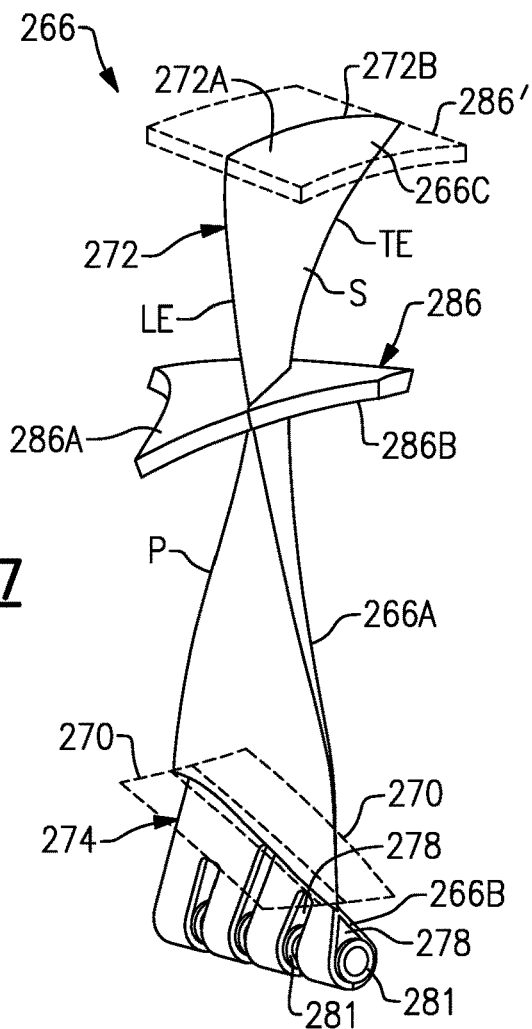
FIG. 17 illustrates an airfoil including a shroud according to yet another example.
Figure 18:
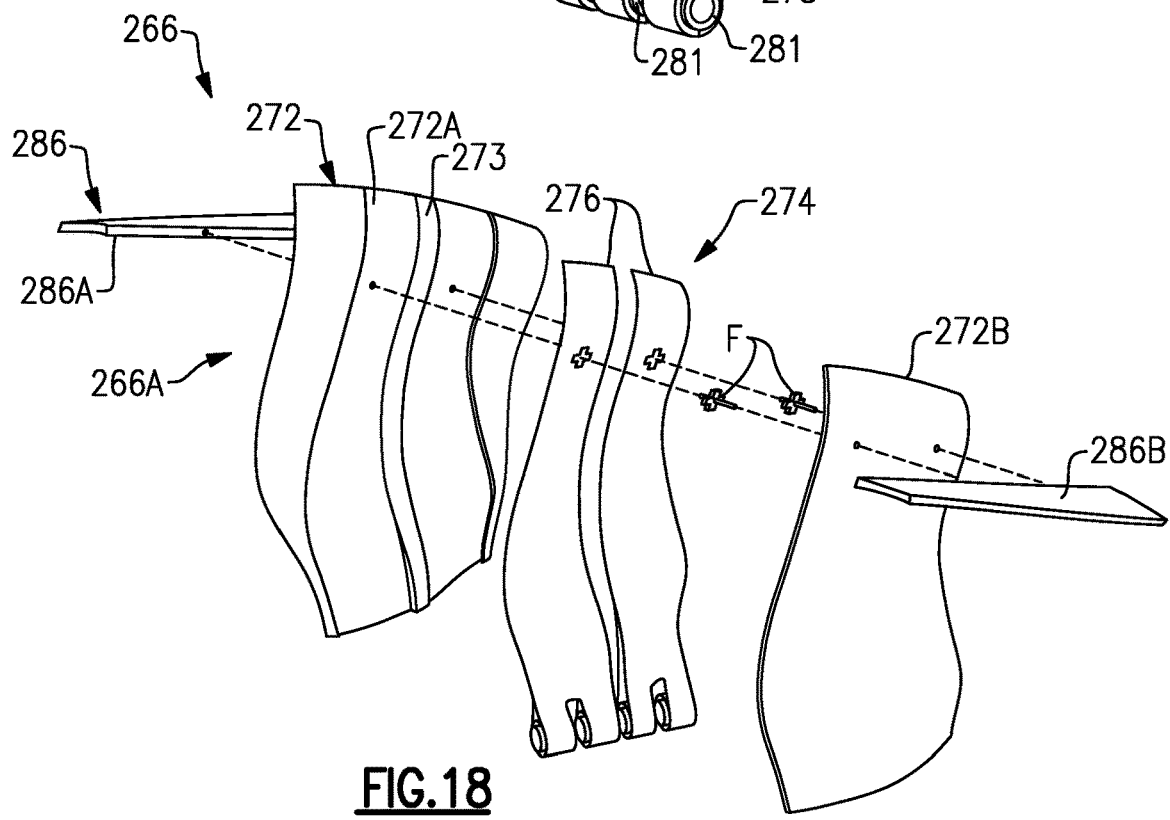
FIG. 18 illustrates an exploded view of the airfoil of FIG. 17.

FIGS. 17 and 18 illustrate an airfoil 266 according to yet another example. Airfoil 266 includes at least one shroud 286 that extends outwardly from pressure and suction sides P, S of airfoil section 266A at a position radially outward of platforms 270 (shown in dashed lines in FIG. 17 for illustrative purposes). The shroud 286 defines an external surface contour and can be utilized to tune mode(s) of the airfoil 266 by changing boundary constraints. The shroud 286 can be made of a composite or metallic material, including any of the materials disclosed herein, or can be made of an injection molded plastic having a plastic core and a thin metallic coating, for example. The airfoil 266 can include a second shroud 286' (shown in dashed lines) to provide a dual shroud architecture, with shroud 286 arranged to divide airfoil between bypass and core flow paths B, C (FIG. 1) and shroud 286' for reducing a flutter condition of the airfoil 266, for example.

The shroud 286 includes first and second shroud portions 286A, 286B secured to the opposing pressure and suction sides P, S. The shroud portions 286A, 286B can be joined together with one or more inserts fasteners F that extend through the airfoil section 266A. The fasteners F can be baked into the ligaments 276, for example, and can be frangible to release in response to a load on either of the shroud portions 286A, 286B exceeding a predefined threshold. It should be appreciated that other techniques can be utilized to mechanically attach or otherwise secure the shroud portions 286A, 286B to the airfoil 266, such as by an adhesive, welding or integrally forming the skins 272A, 272B with the respective shroud portions 286A, 286B. In some examples, the airfoil 266 includes only one of the shroud portions 286A, 286B such that the shroud 286 is on only one side of the airfoil section 266A or is otherwise unsymmetrical.

Figure 19:
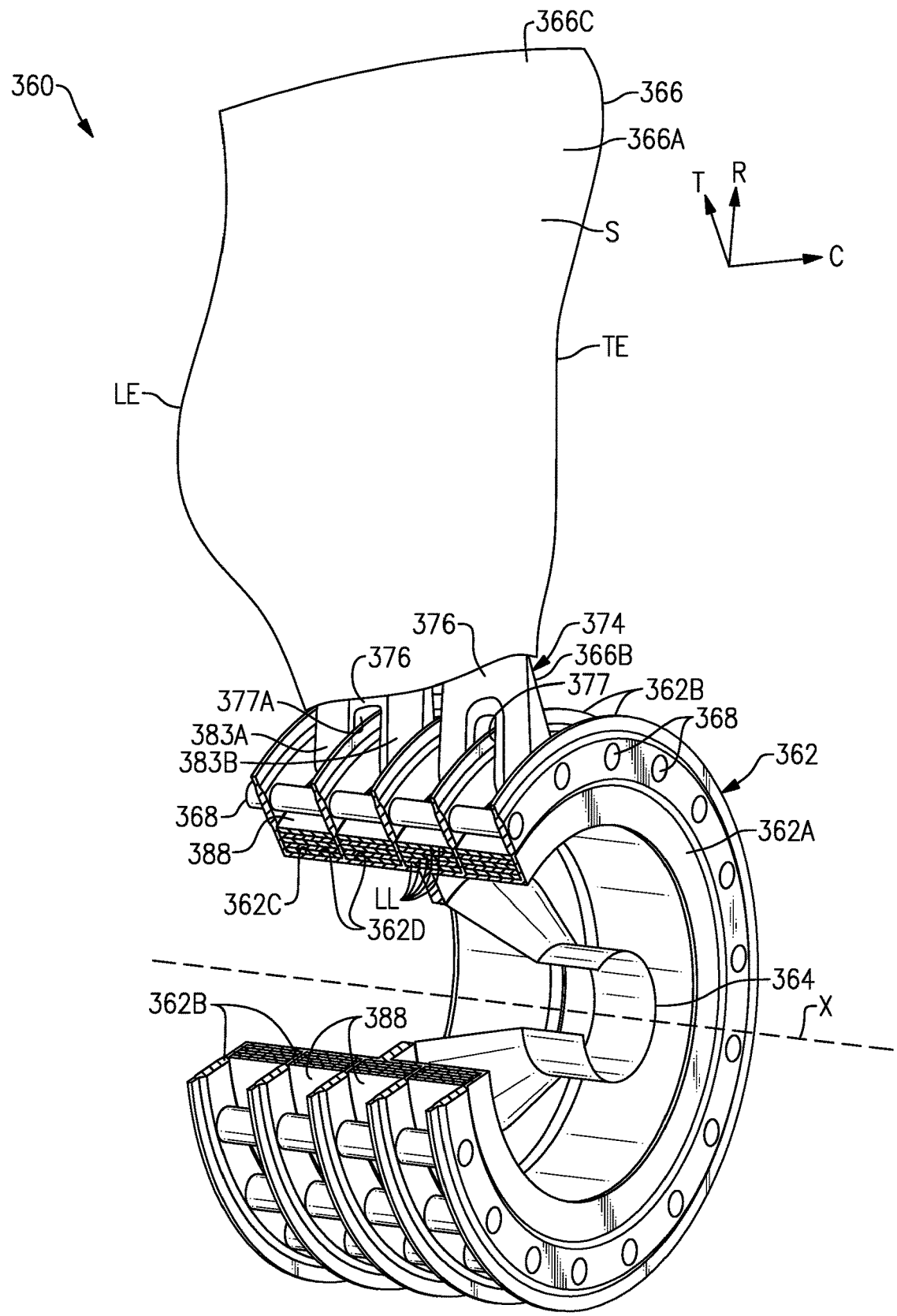
FIG. 19 illustrates a rotor assembly to another example.
Figure 20:
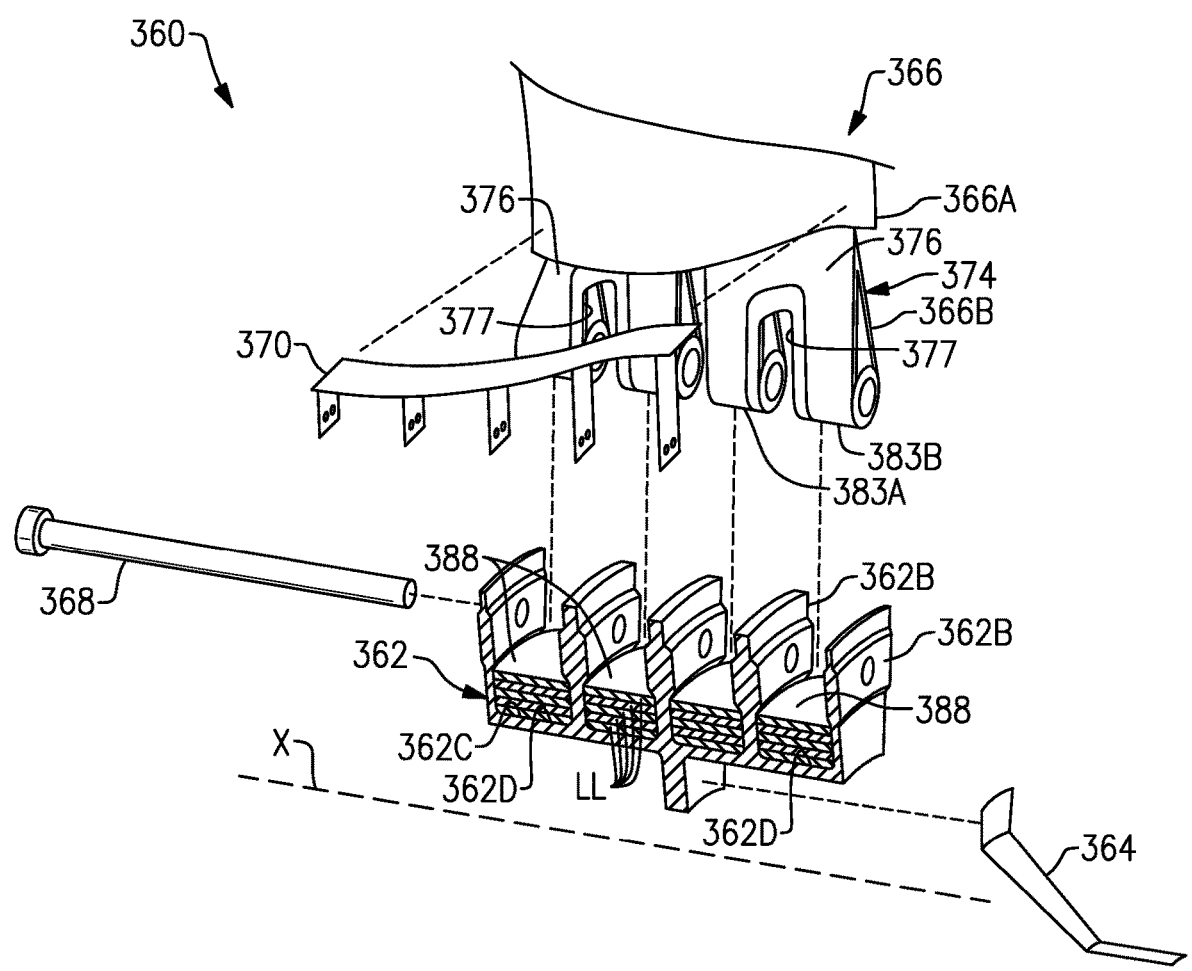
FIG. 20 illustrates an exploded view of portions of the rotor assembly of FIG. 19.
Figure 21:
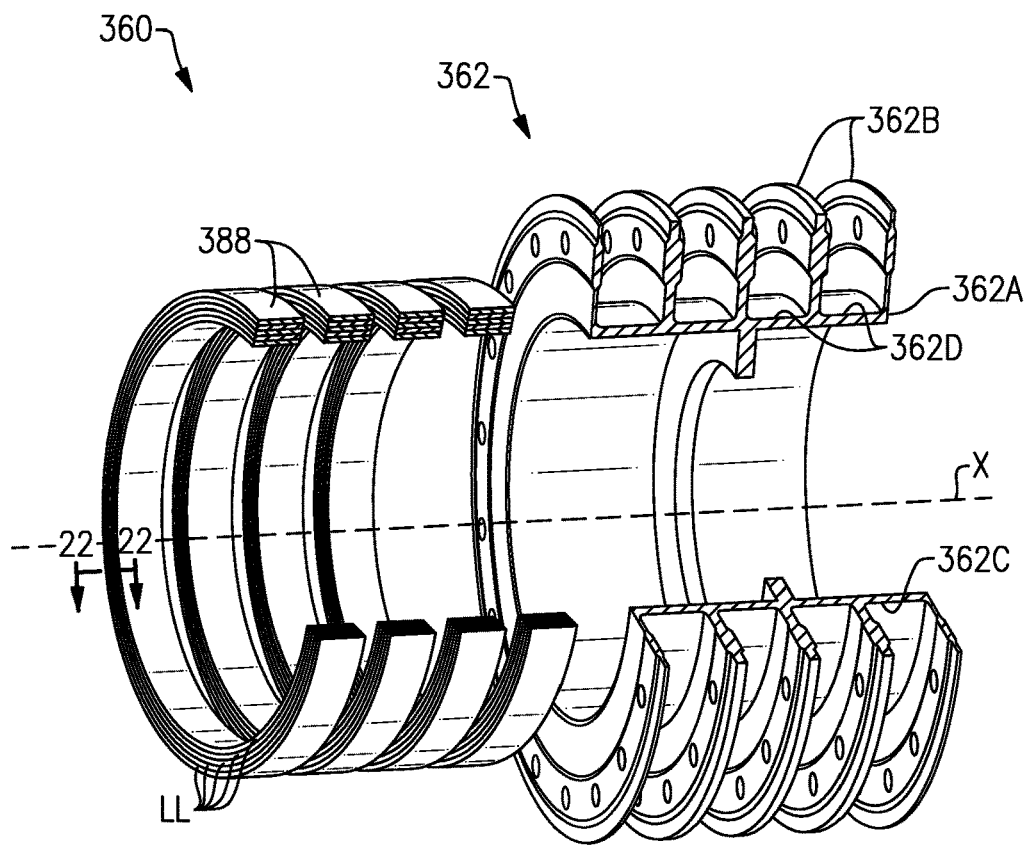
FIG. 21 illustrates an isolated view of a hub and reinforcement members of the rotor assembly of FIG. 19.

FIGS. 19-21 illustrate a rotor assembly 360 according to another example. Each annular channel 362D of hub 362 is dimensioned to receive a composite reinforcement member 388. Each reinforcement member 388 can have an annular geometry and is dimensioned to extend about the outer periphery 362C of the hub 362 and to be received within a respective channel 362D.

As illustrated by FIGS. 19 and 20, each reinforcement member 388 can be situated radially between the outer periphery 362C of the hub 362 and the retention pins 368. An outer diameter of the reinforcement member 388 can be positioned radially inward of an innermost portion of each of the ligaments 376 of core 374 such that each reinforcement member 388 is situated radially between the outer periphery 362C and the respective ligament 376. The retention pins 368 can be positioned radially outboard of the reinforcement members 388 with respect to the longitudinal axis X.

Figure 22:
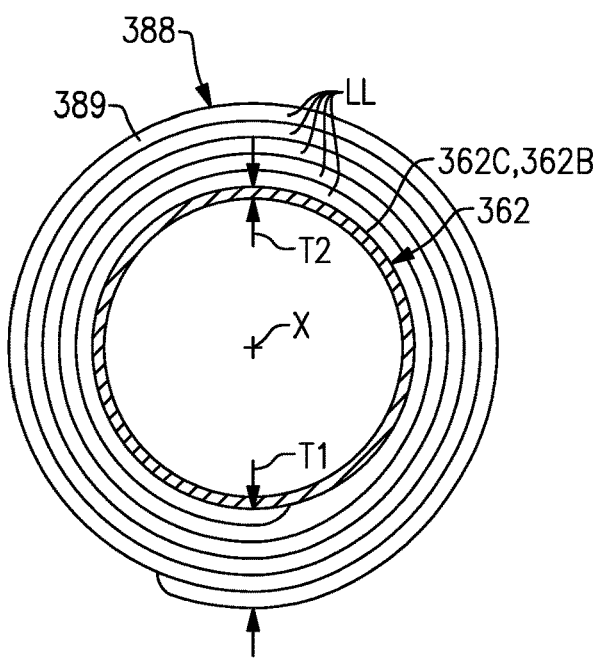
FIG. 22 illustrates a sectional view of one of the reinforcement members taken along line 22-22 of FIG. 21.

Each reinforcement member 388 can include at least one composite layer LL that is formed to extend around the outer periphery 362C of the hub 362. Referring to FIG. 22, with continued reference to FIGS. 19-21, the reinforcement member 388 can have a plurality of composite layers LL. Each layer LL can include any of the composite materials and fiber constructions disclosed herein, including carbon and CMC materials. For example, the reinforcement member 388 can be a carbon tape 389 having uni-directional fibers and that is continuously wound around the outer periphery 362C of the hub 362 two or more times to define the composite layers LL, such as a total of five layers LL. It should be understood that the reinforcement member 388 can have fewer or more than five layers LL. The tape 389 can be a dry form and impregnated or injected with an epoxy or resin after formation along the hub, and then cured to fabricate the reinforcement member 388, for example, which can reduce creep.

The reinforcement member 388 can be constructed relative to a dimension of the hub 362 to reinforce the hub 362 during engine operation. For example, the reinforcement member 388 can define a first thickness T1. The hub 362 can define a second thickness T2 along the outer periphery 362C that defines a respective one of the channels 362B. In some examples, the second thickness T2 is less than the first thickness T1. For example, a ratio of thickness T2 to thickness T1 can be less than 1:2, or more narrowly less than 1:3 or 1:4, for at least some, or each, of the reinforcement member 388 The reinforcement members 388 reinforce or support the hub 362 along the outer periphery 362C to react centrifugal forces and carry relatively high hoop loads during engine operation, and can reduce an overall weight of the hub 362, for example.

Figure 23:
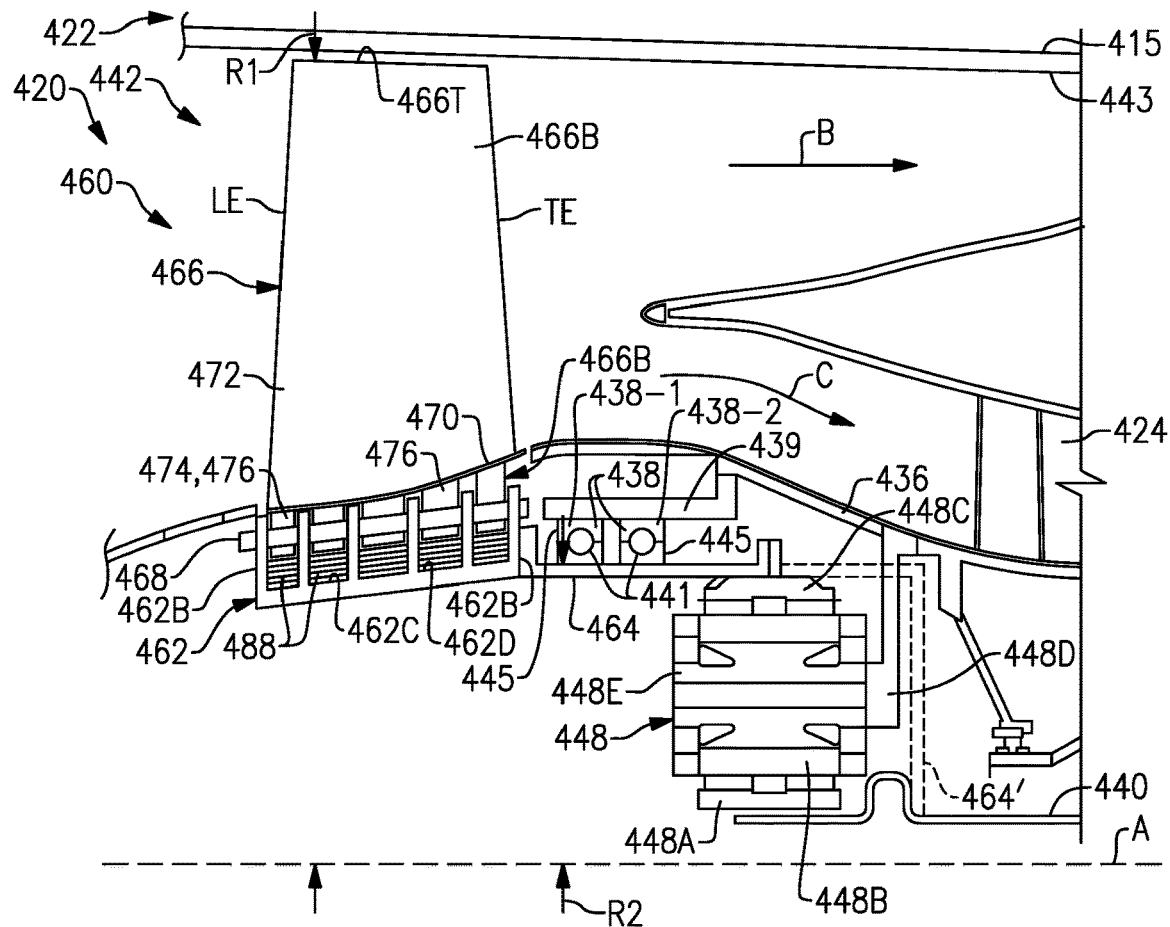
FIG. 23 illustrates a rotor assembly according to yet another example.

FIG. 23 illustrates a gas turbine engine 420 including a rotor assembly 460 according to another example. Fan section 422 delivers a portion of airflow into a core flow path C defined by compressor section 424 and another portion of airflow into a bypass flow path B defined by a bypass duct 443 of a fan case or nacelle 415. The rotor assembly 460 includes retention pins 468 (one shown for illustrative purposes) to releasably secure each airfoil 466 to the hub 462.

The rotor assembly 460 can be driven by shaft 440 through geared architecture 448. Geared architecture 448 can be an epicyclic gear train such as a planetary or star gear system including a sun gear 448A, intermediate gears 448B (one shown for illustrative purposes) and ring gear 448C. The sun gear 448A is mechanically attached or otherwise secured to the shaft 440. The ring 448C surrounds each intermediate gear 448B and sun gear 448A. Each intermediate gear 448B meshes with the sun gear 448A and ring gear 448C. The geared architecture 448 includes a carrier 448D that supports journal bearings 448E (one shown for illustrative purposes) that each carry a respective intermediate gear 448B.

Carrier 448D can be mechanically attached or otherwise fixedly secured to engine static structure 436. Ring gear 448C can be mechanically attached to fan shaft 464, which is mechanically attached to a flange 462B or another portion of the hub 462. In other examples, the shaft 440 is directly attached to fan shaft 464' (shown in dashed lines for illustrative purposes), and the geared architecture 448 is omitted. The hub 462 and fan shaft 464 can be mechanically attached with one or more fasteners. Rotation of the shaft 440 causes rotation of the hub 462 to rotate each airfoil 466.

The engine 420 can include at least one bearing assembly 438 that supports an outer diameter of the fan shaft 464. Each bearing assembly 438 can be mechanically attached and carried by a bearing support 439, which is mechanically attached or otherwise secured to the engine static structure 436.

In the illustrated example of FIG. 23, the engine 20 includes two bearing assemblies 438-1, 438-2 that support the fan shaft 464 at a location that is axially forward of the geared architecture 448 with respect to engine longitudinal axis A. Each bearing assembly 438 includes at least one bearing 441 and carrier 445 that support the fan shaft 464 at a position that is radially outward a portion of the geared architecture 448 such as the ring gear 448C with respect to the engine longitudinal axis A. Each bearing 441 can be a ball bearing, roller bearing or taper bearing, for example. In the illustrated example of FIG. 23, at least a portion of the bearing assemblies 438-1, 438-2 are positioned radially outward of the outer periphery 462C of the hub 462 with respect to the engine longitudinal axis A, with bearing assembly 438-1 being an axially forwardmost bearing assembly 438 relative to the engine longitudinal axis A. The bearing assemblies 438-1, 438-2 can be radially aligned or outward of the annular channels 462D with respect to the engine longitudinal axis A.

The arrangement of the rotor assembly 460 can be utilized to increase a volume V radially inward of the hub 462 and/or fan shaft 464, including positioning bearing assemblies 438 at a relatively further distance radially outward from the engine longitudinal axis A. The relatively greater volume V can serve to incorporate different types of bearings and support architectures for the hub 462, for example. A radially outermost portion or tip 466T of airfoil section 466A defines first radius R1, and an outer diameter of the fan shaft 464 defines a second radius R2 adjacent to each respective one of the bearing assemblies 438-1, 438-2 with respect to the engine longitudinal axis A. In some examples, a ratio of the first radius R1 to the second radius R2 is greater than or equal to 2:1, or more narrowly greater than or equal to 3:1 or 4:1.

Figure 24:
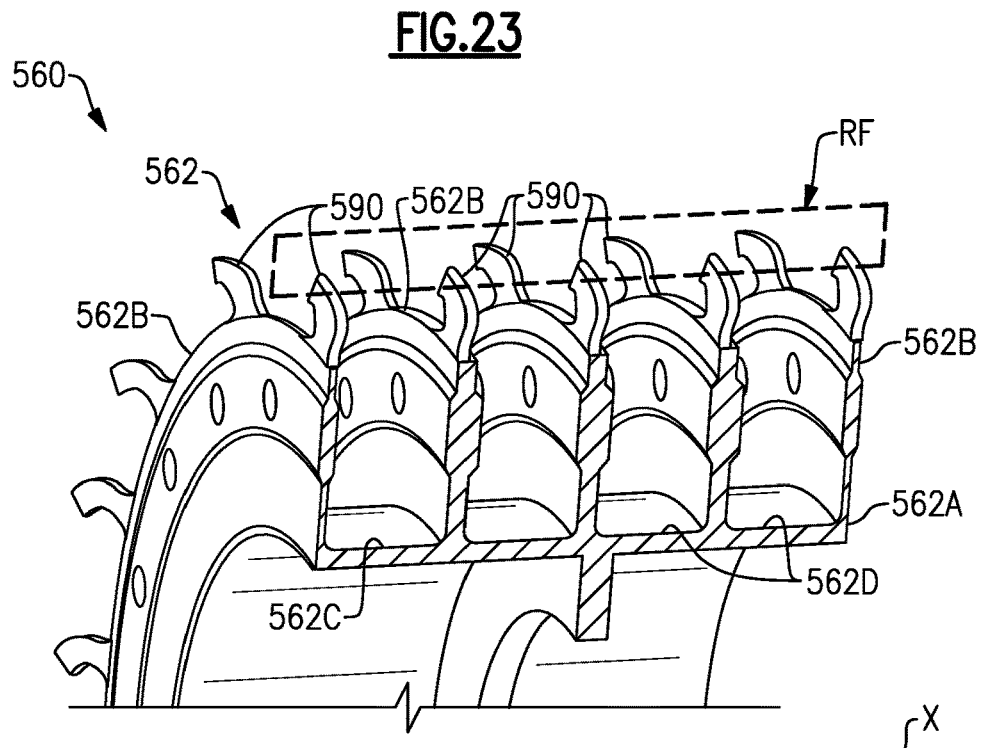
FIG. 24 illustrates a hub including retention members according to another example.
Figure 25:
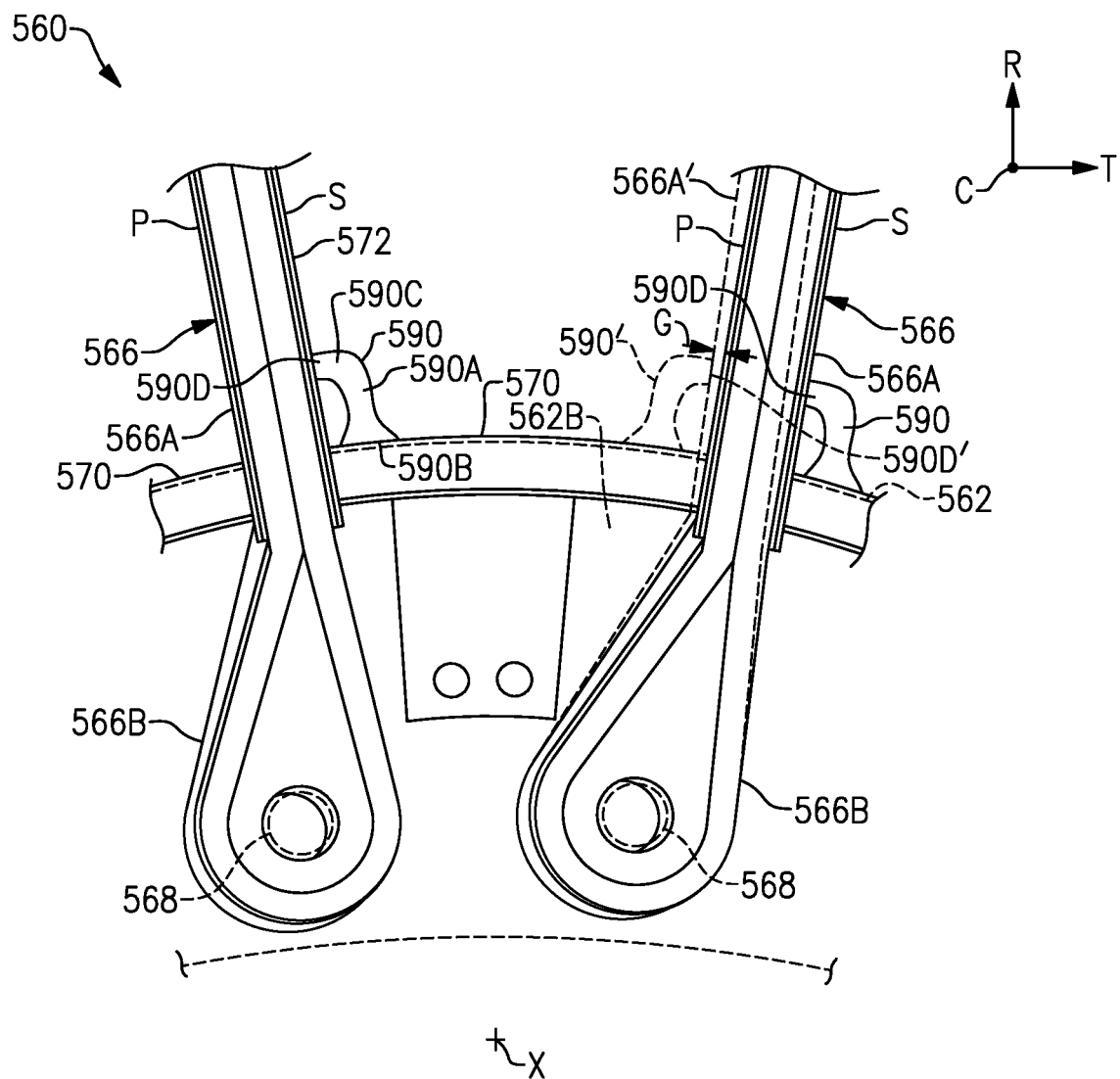
FIG. 25 illustrates the retention members of FIG. 24 positioned relative to adjacent airfoils.
Figure 26:
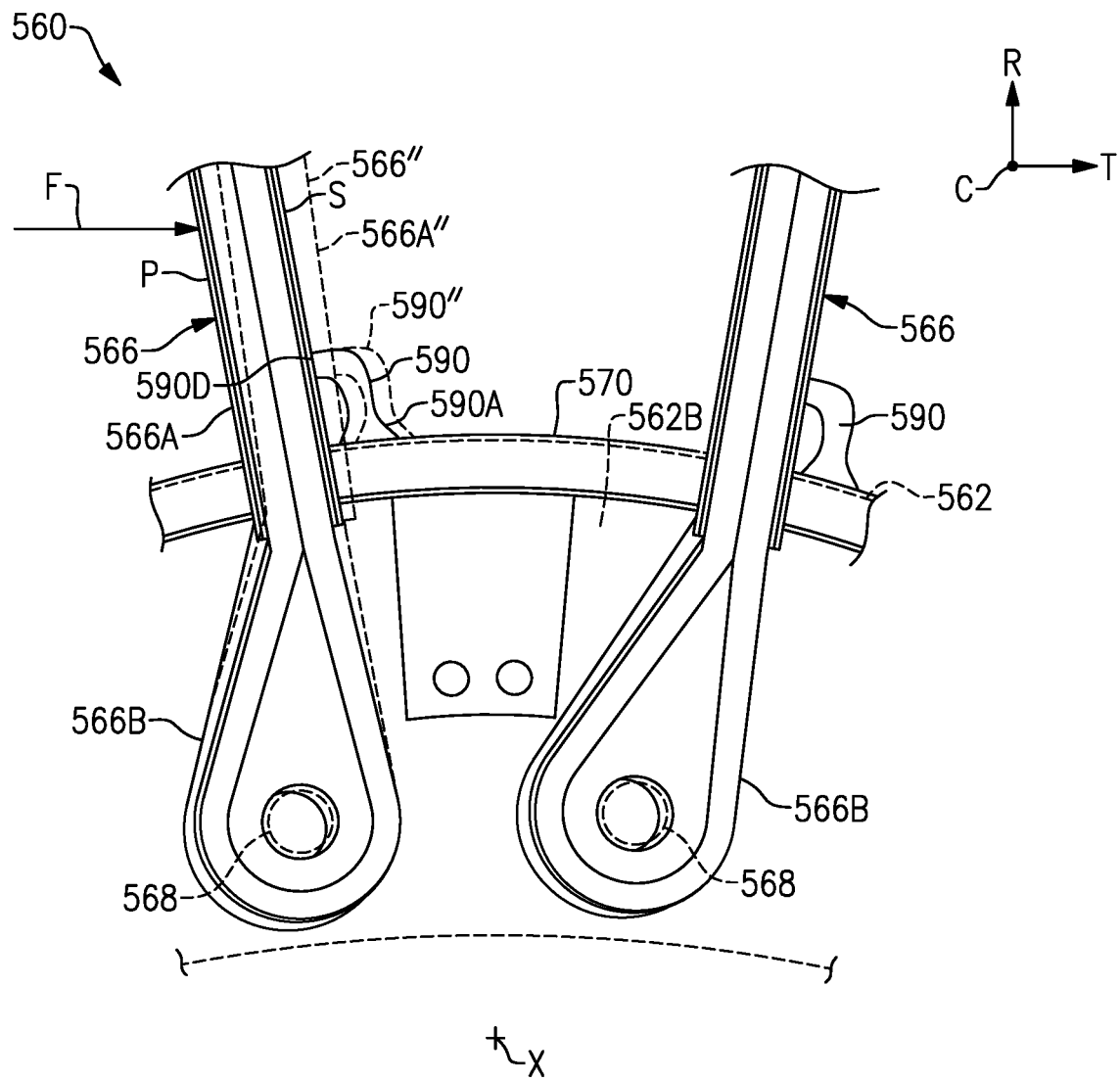
FIG. 26 illustrates the retention members of FIG. 25 and an adjacent airfoil in different positions.

FIGS. 24-26 illustrate a rotor assembly 560 according to another example. Hub 562 includes an array of bumpers or retention members 590 extending outwardly from each one of the annular flanges 562B. The retention members 590 can be arranged in sets or rows such that each set of retention members 590 are substantially axially aligned a respective reference plane RF and support an adjacent airfoil 566 (shown in FIGS. 25-26). The reference plane RF can correspond to an external surface contour or profile of the adjacent airfoil section 566A.

Referring to FIG. 25 with continued reference to FIG. 24, each retention member 590 has a retention body 590A having a generally L-shaped geometry that extends between a first end portion 590B and a second end portion 590C that defines a contact surface 590D. The first end portion 590B is mechanically attached or otherwise secured to an outer diameter of the respective annular flange 562B (shown in dashed lines for illustrative purposes). The contact surface 590D can be contoured to mate with external surfaces of the airfoil section 566A.

Each contact surface 590D of the retention members 590 can be dimensioned to abut against a sheath 572 of an adjacent airfoil section 566A to support the airfoil 566 and transfer loads between the airfoil section 566A and the hub 562 during engine operation. For example, the contact surface 590D can be dimensioned to abut against the suction side S, or abut against the pressure side P as illustrated by retention member 590' (shown in dashed lines for illustrative purposes). The airfoil section 566A can be pivotable about a respective one of the retention pins 568. The airfoil section 566A can be moveable between first and second positions (indicated by airfoil section 566A' in dashed lines) such that contact surface 590D' is spaced apart from the airfoil section 566A to define a circumferential gap G in the first position, but abuts against the airfoil section 566A' in the second position.

Each platform 570 can be dimensioned to abut against respective pairs of airfoils 566 radially inward of the contact surface 590D of each retention member 590. The contact surface 590D of each retention members 590 can be radially outward from retention pins 568 (shown in dashed lines for illustrated purposes) with respect to the longitudinal axis X. The combination of platforms 570 and retention members 590 can cooperate to provide relatively greater support to the airfoils 566 as compared to the platforms 570 alone, and can reduce a weight of the airfoils 566.

Referring to FIG. 26, with continued reference to FIGS. 24 and 25, each airfoil 566 can experience a load or force F, such as vibratory loads, an impact from a bird strike or another FOD event that may occur during engine operation. Force F may be applied or exerted on the pressure side P of the airfoil 566, for example, causing or otherwise urging the airfoil 566 to pivot about or otherwise move relative to retention pin 568 and lean in a circumferential or thickness direction T, as illustrated by airfoil section 566A" of airfoil 566" (shown in dashed lines). Each retention member 590 limits or otherwise opposes circumferential movement of the airfoil section 566A of the adjacent airfoil 566.

Each retention member 590 can have a construction such that the retention body 590A reacts, but deflects or yields to, load or force F on the respective airfoil 466 during engine operation. Each retention member 590 can establish a spring force to oppose loads on the airfoil 566. One or more of the retention members 590 is moveable from a first position to second position (illustrated by 590" in dashed lines) to react to the force F and oppose circumferential movement of the airfoil 566. The retention member 590 can be constructed to yield to force F to at least partially absorb and transfer the force F from the airfoil section 566A to the hub 562.

Figure 27:
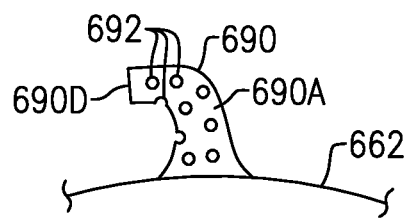
FIG. 27 illustrates an example retention member.

The retention body 590A of each retention member 590 can be made of a metallic material and can be integrally formed with a respective one of the flanges 562B. For example, each retention member 590 can be machined from an unfinished portion of the hub 562, which can be a cast component. In other examples, the retention member 590 is a separate and distinct component that is mechanically attached or otherwise secured to the respective flange 562B. In some examples, each retention member 590 is a frangible structure that is constructed to yield but oppose the force F in response to the force F being below a predefined limit, but is constructed to shear or break in response to the force F exceeding a predefined limit. In the illustrative example of FIG. 27, each retention members 590 can define one or more cutouts 692 in a thickness of the retention body 690A to weaken selective portions of the retention member 690. The cutouts 692 can be apertures, grooves or indentations in the retention body 690A, for example. The quantity, size and/or profile of the cutouts 692 can be defined with respect to a predefined limit of an expected force or load on the respective airfoil. The cutouts 692 can be drilled or machined to cause the retention member 690 to bend or buckle in response to a force or load exceeding the predefined limit.

Figure 28:
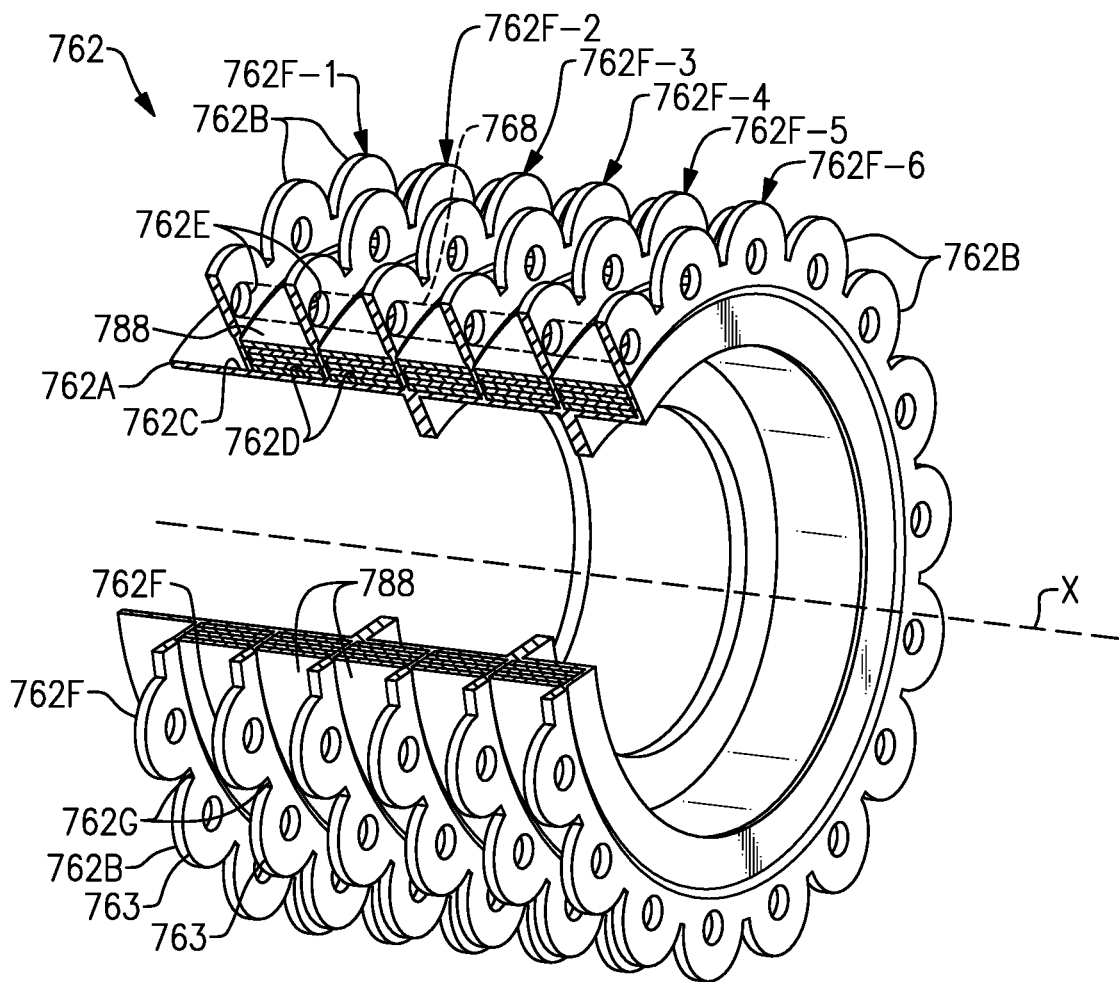
FIG. 28 illustrates a hub for a rotor assembly according to an example.

FIG. 28 illustrates an annular hub 762 for a rotor assembly according to an example. Flanges 762B of hub 762 includes a plurality of scallops 762F arranged in rows 762F-1 to 762F-6 about an outer periphery 762C of main body 762A. A perimeter of each scallop 762B can have a generally arcuate geometry that slopes toward valleys 762G defined between adjacent scallops 762B such that an outer perimeter 763 of each of the rows 762F-1 to 762F-6 has a generally sinusoidal profile about longitudinal axis X. Each scallop 762B defines at least one bore 762E for receiving a retention pin 768 (one shown in dashed lines for illustrative purposes) to secure an airfoil to the hub 762. The arrangement of scallops 762F can lower stresses, which can reduce wear of the retention pins, and can also reduce installation complexity.

Figure 29:
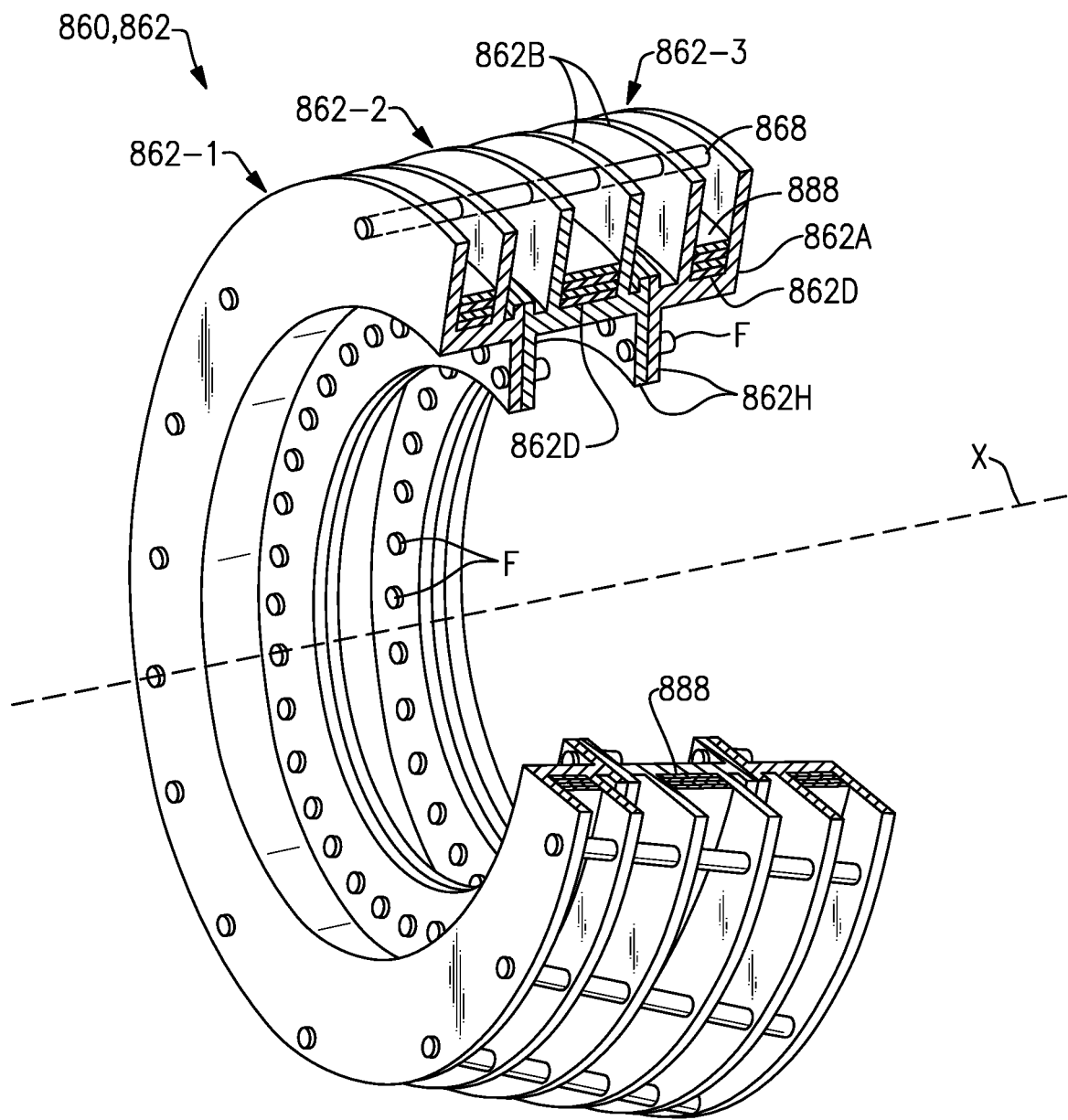
FIG. 29 illustrates a hub for a rotor assembly according to yet another example.
Figure 30:
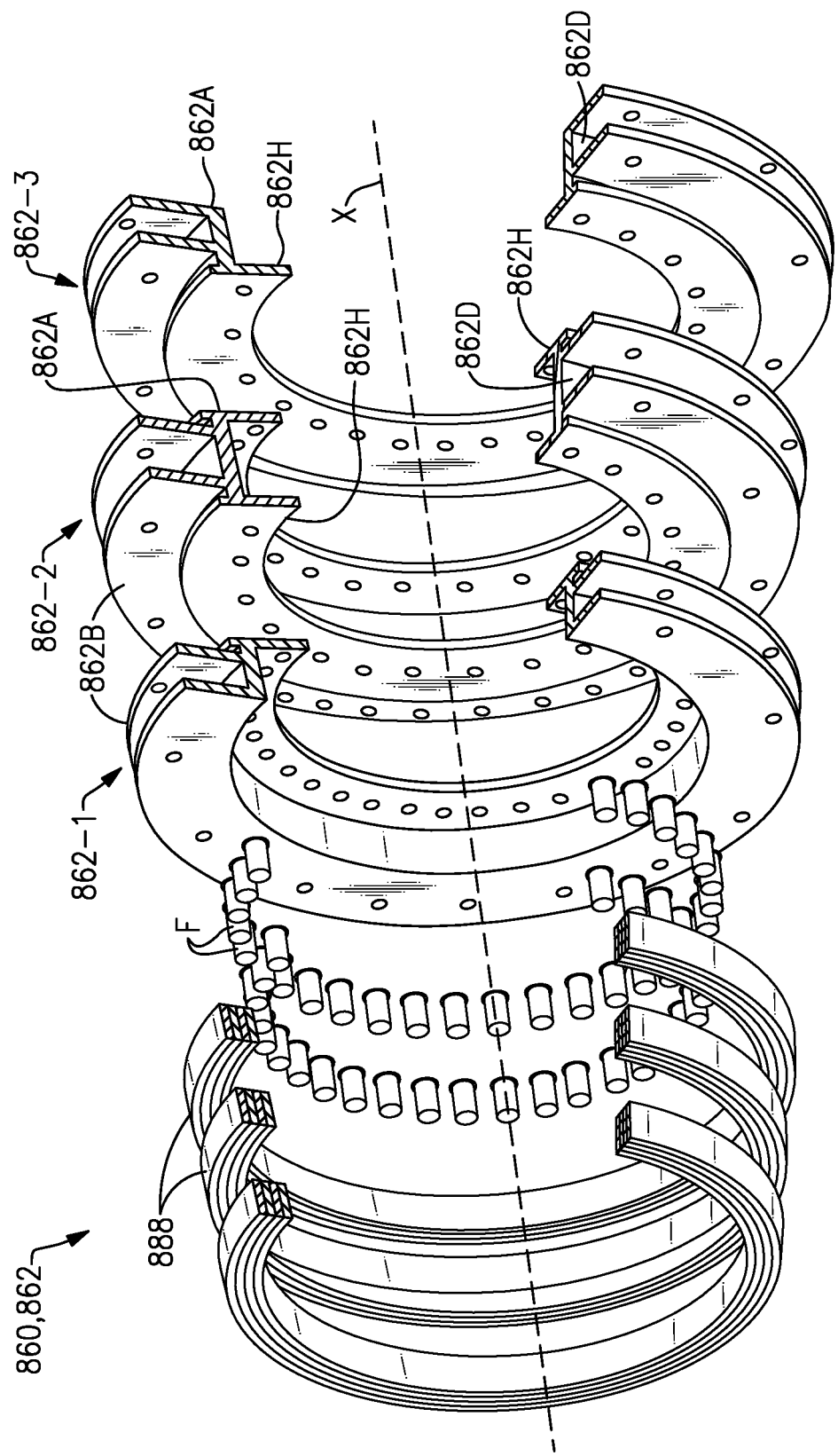
FIG. 30 illustrates an exploded view of the hub of FIG. 29.

FIGS. 29 and 30 illustrate an annular hub 862 for a rotor assembly 860 according to another example. The hub 862 can include hub portions 862-1, 862-2 and 862-3 that are mechanically attached or otherwise secured to each other to define an assembly. Each of the hub portions 862-1, 862-2 and 862-3 includes one or more flanges 862B to receive retention pins 868 (one shown in dashed lines in FIG. 29 for illustrative purposes). Each of the hub portions 862-1, 862-2 and 862-3 includes one or more mounting flanges 862H that extend inwardly from a respective main body 862A. Composite reinforcement members 888 can be received in annular channels 862D defined by the hub portions 862-1, 862-2 and 862-3. The hub portions 862-1, 862-2 and 862-3 can be mechanically attached or otherwise secured to each other with one or more fasteners F received through bores defined in the mounting flanges 862H, for example.

Figure 31:
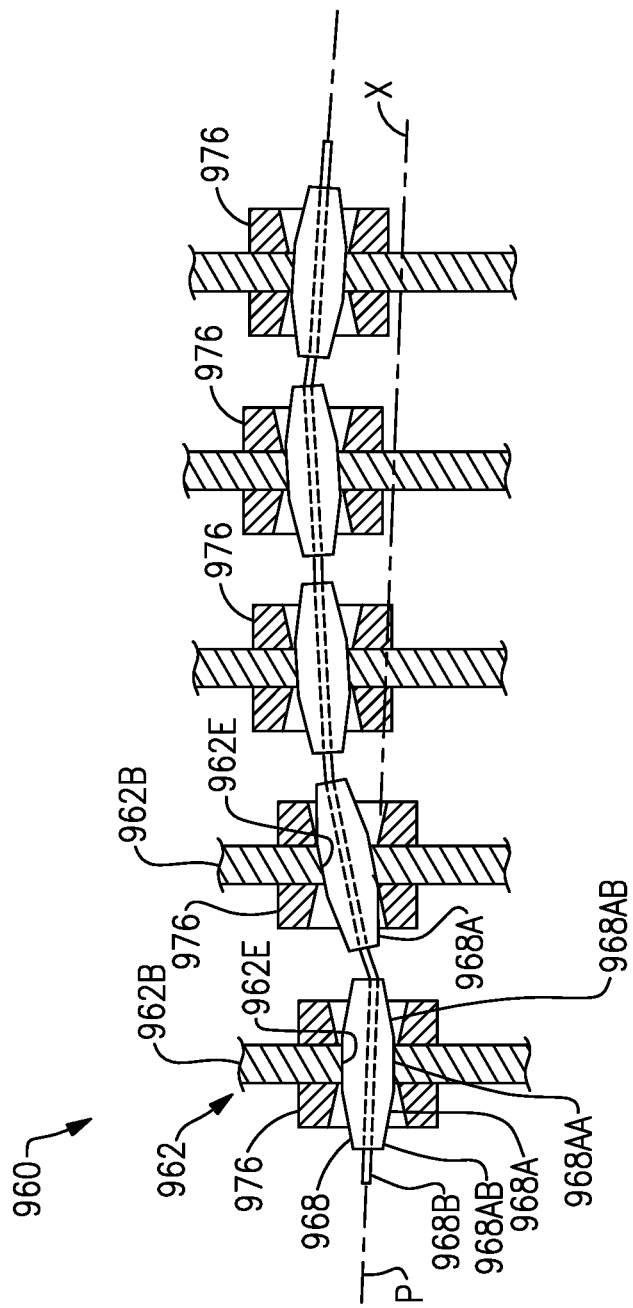
FIG. 31 illustrates a sectional view of a rotor assembly according to another example.
Figure 32:
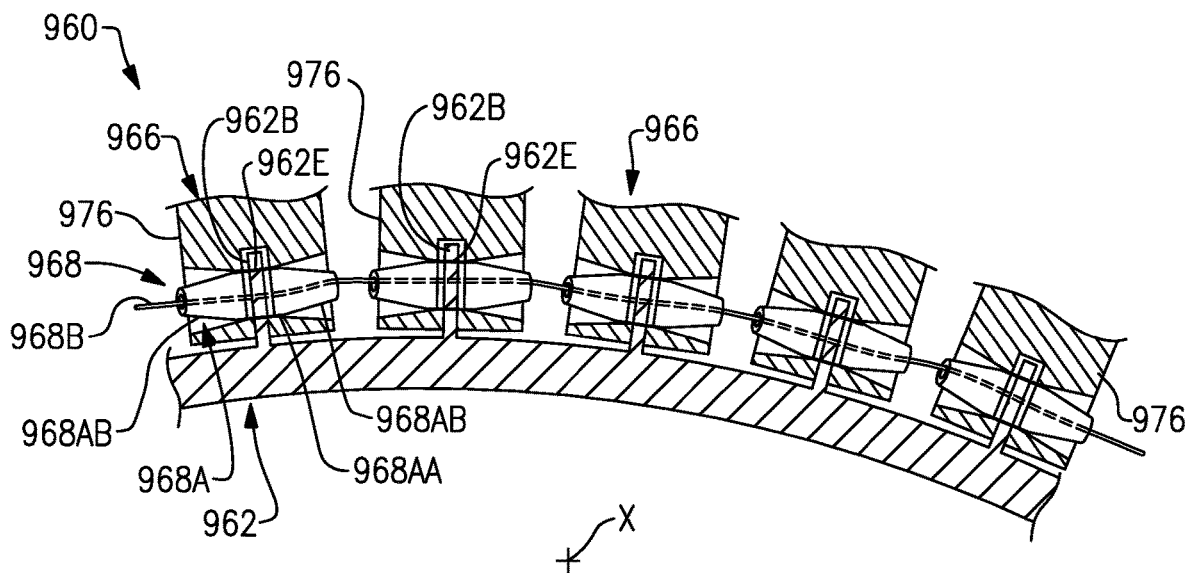
FIG. 32 illustrates a sectional view of the rotor assembly of FIG. 31.
Figure 33:
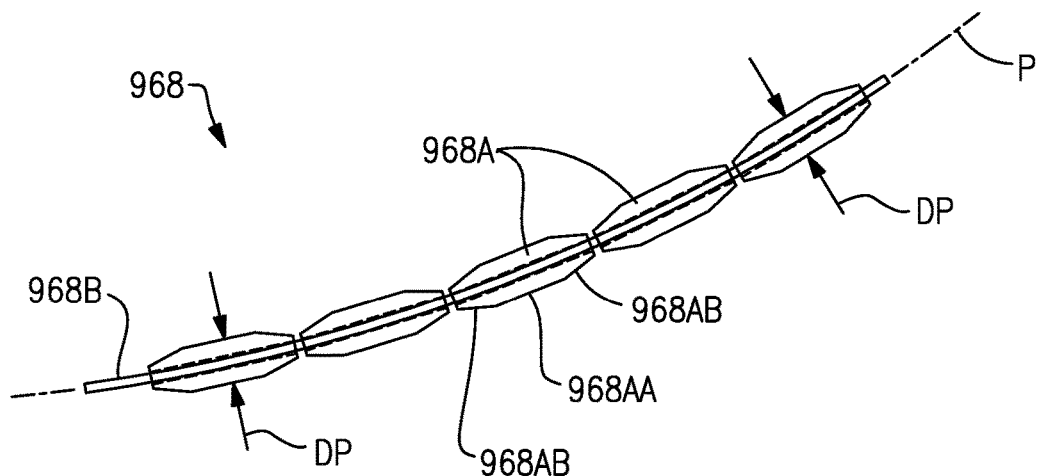
FIG. 33 illustrates an isolated view of a retention pin of the rotor assembly of FIG. 31.

FIGS. 31 and 32 illustrates a rotor assembly 960 according to another example. FIG. 33 illustrates an isolated view of a segmented retention pin 968 of the rotor assembly 960. Each retention pin 968 includes a plurality of segments 968A linked together by an elongated carrier 968B. Each of the segments 968A is separate and distinct and includes a main body 968AA and a pair of end portions 968AB that can taper from the main body 968AA to define a substantially cone-cylinder-cone geometry. An outer periphery of the main body 988AA defines an outer diameter DP (FIG. 33). In some examples, the segments 968A are dimensioned such that the outer diameter DP of the segments 968A is progressively smaller along the retention pin 968. Each segment 968A can be made of a metallic material, such as steel, for example. The carrier 968B can be a flexible wire, for example. The segments 968A can be slideably received onto and supported by the carrier 968A. Although five segments 968A are shown, fewer or more than five segments 968A can be utilized.

The carrier 968B defines a pin axis P. The pin axis P can be substantially straight or can be curved including one or more curved portions such that the pin axis P is not parallel to the longitudinal axis X when in an installed position, as illustrated by FIG. 31. The profile of the pin axis P can be defined with respect to a contour of a respective airfoil 466.

During assembly, each segment 968A is received in a respective bore 862E defined by a respective flange 962B of the hub 962 and a respective ligament 976 of an airfoil 966, as illustrated by FIGS. 32 and 33. The bores 862E can be defined in the flanges 962B to establish a contour of the pin axis P.

The arrangement of the retention pin 968 including a curved profile of the pin axis P can be utilized to reduce stresses in the respective ligaments 976 and can reduce a distance between adjacent retention pins 968 that may otherwise overlap with the use of substantially straight profiles, which can reduce weight and can improve tuning and aerodynamic efficiency of the airfoils.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A rotor assembly for a gas turbine engine comprising:
a rotatable hub including a metallic main body extending along a longitudinal axis, and including an array of annular flanges extending about an outer periphery of the main body to define an array of annular channels along the longitudinal axis;
an array of airfoils circumferentially distributed about the outer periphery, each one of the airfoils including an airfoil section extending from a root section received in the annular channels;
a plurality of retention pins, each one of the retention pins extending through the root section of a respective one of the airfoils and through the array of annular flanges to mechanically attach each root section to the hub; and
wherein each of the retention pins includes a plurality of segments slideably received on an elongated carrier, and the carrier defines a curved pin axis when in an installed position.

2. The rotor assembly as recited in claim 1, further comprising:
an array of platforms mechanically attached to the hub and that abut against respective pairs of the airfoils radially outward of the retention pins relative to the longitudinal axis.

3. The rotor assembly as recited in claim 2, wherein each airfoil section includes a metallic sheath and a composite core, each core including first and second ligaments at least partially received in respective internal channels defined in each sheath.

4. The rotor assembly as recited in claim 3, wherein the plurality of segments are distributed along the pin axis of the carrier, and each of the segments is received in a respective one of the annular flanges and is received in a respective one of the first and second ligaments in the installed position.

5. The rotor assembly as recited in claim 1, wherein the annular channels includes a first annular channel that receives a composite reinforcement member, and the composite reinforcement member extends about the outer periphery of the hub.

6. The rotor assembly as recited in claim 5, wherein the composite reinforcement member includes at least one composite layer that extends at least one full revolution around the outer periphery relative to the longitudinal axis.

7. The rotor assembly as recited in claim 6, wherein the composite reinforcement member defines a first thickness, and the hub defines a second thickness along the outer periphery that defines the first annular channel, and the second thickness is less than the first thickness.

8. The rotor assembly as recited in claim 6, wherein the at least one composite layer is a plurality of composite layers, and each composite reinforcement member is a carbon tape wound around the outer periphery two or more times to define the composite layers.

9. The rotor assembly as recited in claim 1, wherein each of the annular flanges is defined by a plurality of scallops arranged in a respective row about the outer periphery of the hub.

10. The rotor assembly as recited in claim 1, wherein each of the segments includes a segment body extending between first and second end portions, and the first and second end portions taper in directions extending from the segment body.

11. A gas turbine engine comprising:
a compressor section including a compressor;
a turbine section including a turbine; and
a propulsor section including a propulsor shaft rotatable about an engine longitudinal axis, wherein the propulsor section includes a rotor assembly, the rotor assembly comprising:
a rotatable hub including a main body mechanically attached to the propulsor shaft, and including an array of annular flanges extending about an outer periphery of the main body to define an array of annular channels along the engine longitudinal axis;
an array of airfoils each including an airfoil section extending from a root section; and
a plurality of retention pins, each one of the retention pins extending through the root section of a respective one of the airfoils and through the array of annular flanges to mechanically attach each root section to the hub, and wherein each of the retention pins includes a plurality of segments slideably received on an elongated carrier.

12. The gas turbine engine as recited in claim 11, wherein the carrier defines a curved pin axis when in an installed position.

13. The gas turbine engine as recited in claim 11, wherein the segments are moveable relative to each other.

14. The gas turbine engine as recited in claim 11, wherein the turbine drives the propulsor shaft through a geared architecture.

15. The gas turbine engine as recited in claim 11, wherein each airfoil section includes a metallic sheath and a composite core, each core including first and second ligaments at least partially received in respective internal channels defined in the respective sheath.

16. The gas turbine engine as recited in claim 15, wherein, for each of the airfoils:
each one of the ligaments includes at least one interface portion in the root section that receives a respective one of the retention pins, and each one of the ligaments includes at least one composite layer that loops around the at least one interface portion such that opposed end portions of the at least one composite layer are joined together along the airfoil portion.

17. The gas turbine engine as recited in claim 15, wherein the plurality of segments are distributed along a pin axis of the carrier, and each of the segments is received in a respective one of the annular flanges and is received in a respective one of the first and second ligaments in an installed position.

18. The gas turbine engine as recited in claim 17, wherein the pin axis is curved when in the installed position.

19. The gas turbine engine as recited in claim 18, wherein the segments are moveable relative to each other.

20. The gas turbine engine as recited in claim 11, wherein the propulsor section delivers a portion of airflow into the compressor section and another portion of airflow into a bypass duct.

* * * * *